(12) United States Patent
Saiki et al.

(10) Patent No.: US 7,404,463 B2
(45) Date of Patent: Jul. 29, 2008

(54) MOTORCYCLE RADIATOR ARRANGING CONSTRUCTION

(75) Inventors: Terunari Saiki, Saitama (JP); Hideo Amino, Saitama (JP); Masayuki Iwata, Saitama (JP); Shigeki Saimei, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 11/237,763

(22) Filed: Sep. 29, 2005

(65) Prior Publication Data

US 2006/0065455 A1 Mar. 30, 2006

(30) Foreign Application Priority Data

| Sep. 30, 2004 | (JP) | P. 2004-285611 |
| Sep. 30, 2004 | (JP) | P. 2004-285874 |
| Sep. 30, 2004 | (JP) | P. 2004-285936 |
| Sep. 30, 2004 | (JP) | P. 2004-286107 |
| Sep. 30, 2004 | (JP) | P. 2004-286596 |
| Sep. 30, 2004 | (JP) | P. 2004-286635 |

(51) Int. Cl.
*B60K 11/04* (2006.01)

(52) U.S. Cl. .................. 180/68.4; 180/229

(58) Field of Classification Search ............... 180/68.3, 180/229

See application file for complete search history.

(56) References Cited

U.S. PATENT DOCUMENTS

| 4,445,587 A | 5/1984 | Hillman | |
| 4,577,720 A * | 3/1986 | Hamane et al. | 180/229 |
| 5,078,223 A * | 1/1992 | Ishiwatari et al. | 180/68.1 |
| 5,251,713 A * | 10/1993 | Enokimoto | 180/68.4 |
| 7,077,230 B2 * | 7/2006 | Arnold | 180/229 |
| 7,159,682 B2 * | 1/2007 | Arnold | 180/229 |

FOREIGN PATENT DOCUMENTS

| CN | 1276306 C | | 12/2000 |
| CN | 1657356 C | | 8/2005 |
| CN | 1663871 C | | 9/2005 |
| EP | 1564390 A2 | | 8/2005 |
| EP | 1564388 A2 | | 9/2005 |
| JP | 58204917 A | * | 11/1983 |
| JP | 64-34421 U | | 3/1989 |
| JP | 02020428 A | * | 1/1990 |
| JP | 5-201375 A | | 8/1993 |
| JP | 2003-89349 A | | 3/2003 |
| JP | 2007116919 A | * | 5/2007 |

* cited by examiner

*Primary Examiner*—Kevin Hurley
(74) *Attorney, Agent, or Firm*—Birch, Stewart, Kolasch & Birch, LLP

(57) ABSTRACT

An object of the invention is to improve the motorcycle radiator arranging construction with a view to improving the external appearance characteristic of a motorcycle. In a motorcycle having a water-cooled engine 12 installed thereon, a radiator 75 is arranged erect in a space 87 defined between the engine 12 and a rear wheel 16 in such a manner that a front surface 75a thereof is directed in a longitudinal direction of the vehicle and is supported on a body frame 11, whereby the radiator 75 is made difficult to see from the outside compared with a case where the radiator is arranged at the front of the body frame to thereby make conspicuous, for example, the design of the engine.

8 Claims, 36 Drawing Sheets

MOTORCYCLE RADIATOR ARRANGING CONSTRUCTION

The present invention claims foreign priority to Japanese patent application no. P.2004-285611, P.2004-285874, P.2004-285936, P.2004-286107, P.2004-286596 and P.2004-286635, all of them filed on Sep. 30, 2004, the contents of which are incorporated herein by references.

BACKGROUND OF THE INVENTION

1. Field of the Invention

The present invention relates to an improved motorcycle radiator arranging construction.

2. Description of the Background Art

As a conventional motorcycle radiator arranging construction, there is known, for example, Japanese Patent Unexamined Publication No. JP-A-2003-89349 in which a radiator is arranged between body frames ahead of an engine.

This JP-A-2003-89349 will be described. Similar reference numerals to those used in the relevant publication will be used for description. As is shown in FIGS. 1 and 40 of the publication, a motorcycle 1 is a vehicle in which a gusset 32 is attached to a rear portion of a headpipe 21 and a pair of left and right lower or down tubes 33 are caused to extend substantially downwards from the gusset 32, whereby a radiator 10 is arranged between the down tubes 33, and the radiator 10 so arranged is hence positioned ahead of an engine 9.

The radiator 10 is arranged between the left and right down tubes 33 ahead of the engine 9 or at a location best seen from the front of the vehicle. Due to this, for example, even in case the design characteristic of the engine is enhanced, while the engine 9 remains visible from the sides of the vehicle, the engine 9 becomes difficult to see from the front of the vehicle or see diagonally from the front of the vehicle.

To cope with this, attempting to provide it at a rear portion of the body of the vehicle, when the radiator is provided on a swing arm, as to water piping to the radiator, for example, the movability of the radiator needs to be taken into consideration when designing the same.

In addition, when attempting to provide the radiator in the interior of the body, the cooling performance needs to be secured.

Furthermore, since The radiator 10 is arranged between the left and right down tubes 33 ahead of the engine 9 or at a location best seen from the front of the vehicle, for example, even in case the design characteristic of the engine is enhanced, while the engine 9 remains visible from the sides of the vehicle, the engine 9 becomes difficult to see from the front of the vehicle or see diagonally from the front of the vehicle.

SUMMARY OF THE INVENTION

Then, an object of the invention is to secure the cooling performance of a radiator while improving the external appearance of a motorcycle by improving the motorcycle radiator arranging construction.

According to a first aspect of the invention, there is provided a motorcycle radiator arranging construction for a motorcycle having a water-cooled engine installed therein, wherein a radiator is arranged erect in a space defined between the engine and a rear wheel in such a manner that a cooling surface thereof is directed in a longitudinal direction of the vehicle and is supported by a body frame.

Since the radiator is arranged in the space between the engine and the rear wheel in such a manner that the cooling surface is directed in the longitudinal direction of the vehicle, the front of the radiator is covered by the engine, whereas the rear of the radiator is covered by the rear wheel. Consequently, the radiator becomes difficult to see from the longitudinal direction of the vehicle. Furthermore, the radiator is only visible in thickness from the side of the vehicle and hence becomes less conspicuous.

According to a second aspect of the invention, there is provided a motorcycle radiator arranging construction as set forth in the first aspect of the invention, wherein side surfaces of the space is preferably covered by covers.

The space is covered by the covers on the sides thereof, so that the radiator is not exposed from the sides of the vehicle.

According to a third aspect of the invention, there is provided a motorcycle radiator arranging construction as set forth in the first aspect of the invention, wherein a pair of left and right main frames are preferably extended rearwards from a headpipe which supports a front fork in a steerable fashion, and interiors of the main frames are formed into ducts so that running air is guided into the space from the vicinity of the headpipe through the interiors of the main frames.

Since running air is guided into the space from the vicinity of the headpipe through the main frames whose interiors are formed into ducts, a large amount of running air is blown to the radiator. As a result, the cooling of coolant by the radiator is promoted.

According to a fourth aspect of the invention, there is provided a motorcycle radiator arranging construction as set forth in the second aspect of the invention, wherein an intake duct is preferably provided on the cover for guiding running air into the space.

A large amount of running air is guided into the space by providing the intake duct in the cover. As a result, a large amount of running air is allowed to be blown to the radiator, whereby the cooling of coolant by the radiator is promoted further.

According to a fifth aspect of the invention, there is provided a motorcycle radiator arranging construction as set forth in the first aspect of the invention, wherein the radiator is preferably supported between left and right pivot plates which make up the body frame.

Since the radiator is made to be supported between the left and right pivot plates, the radiator can be supported strongly and rigidly by the left and right pivot plates.

According to a sixth aspect of the invention, there is provided a motorcycle radiator arranging construction as set forth in the first aspect of the invention, wherein the radiator is preferably arranged so as to substantially coincide with the left and right pivot plates as viewed from the side of the motorcycle.

The radiator is made difficult to be seen from the side by the left and right pivot plates, thereby making it possible to improve the external appearance of the motorcycle.

According to the first aspect of the invention, since the radiator is arranged in the space between the engine and the rear wheel, the radiator can be made difficult to see from the outside compared with a case where the radiator is arranged at the front of the body frame. Furthermore, since the radiator is arranged erect in such a manner that the cooling surface thereof is directed in the longitudinal direction of the vehicle, the radiator becomes visible only in thickness from the side of the body, whereby the radiator can be made less conspicuous. Consequently, the radiator is made difficult to be exposed to the outside, and moreover, since the engine is not covered by the radiator, the external appearance of the vehicle can be improved when the design characteristic of the engine is enhanced.

In addition, since the radiator is fixed to the body between the engine and the rear wheel, there is caused no risk that the radiator is made to move, and therefore, not only is the degree of freedom in designing water piping increased but also the mounting construction is made simple.

According to the second aspect of the invention, since the space in which the radiator is arranged is covered by the covers on the sides thereof, the radiator is not exposed to the outside, whereby there is provided no impression that the water-cooled engine is installed. For example, in the event that fins similar to those provided on an air cooled engine are provided on the engine, the water-cooled engine can be imparted an impression of an air-cooled engine.

According to the third aspect of the invention, the amount of running air that can be guided to the space between the engine and the rear wheel can be increased by the main frames whose interiors are made into ducts, thereby making it possible to promote further the cooling of coolant by the radiator.

According to the fourth aspect of the invention, a larger amount of running air can be guided into the space between the engine and the rear wheel by the intake duct provided on the cover. The cooling of coolant by the radiator can be promoted much further.

According to the fifth aspect of the invention, since the radiator is supported between the left and right pivot plates which make up the body frame, the radiator can be supported strongly and rigidly by the left and right pivot plates, thereby making it possible to suppress the vibration of the radiator.

According to the sixth aspect of the invention, since the radiator is arranged so as to substantially coincide with the left and right pivot plates as viewed from the side, the radiator is made difficult to see from the side by the left and right pivot plates, thereby making it possible to improve the external appearance of the motorcycle.

DETAILED DESCRIPTION OF THE PREFERRED EMBODIMENTS

Figure 1:
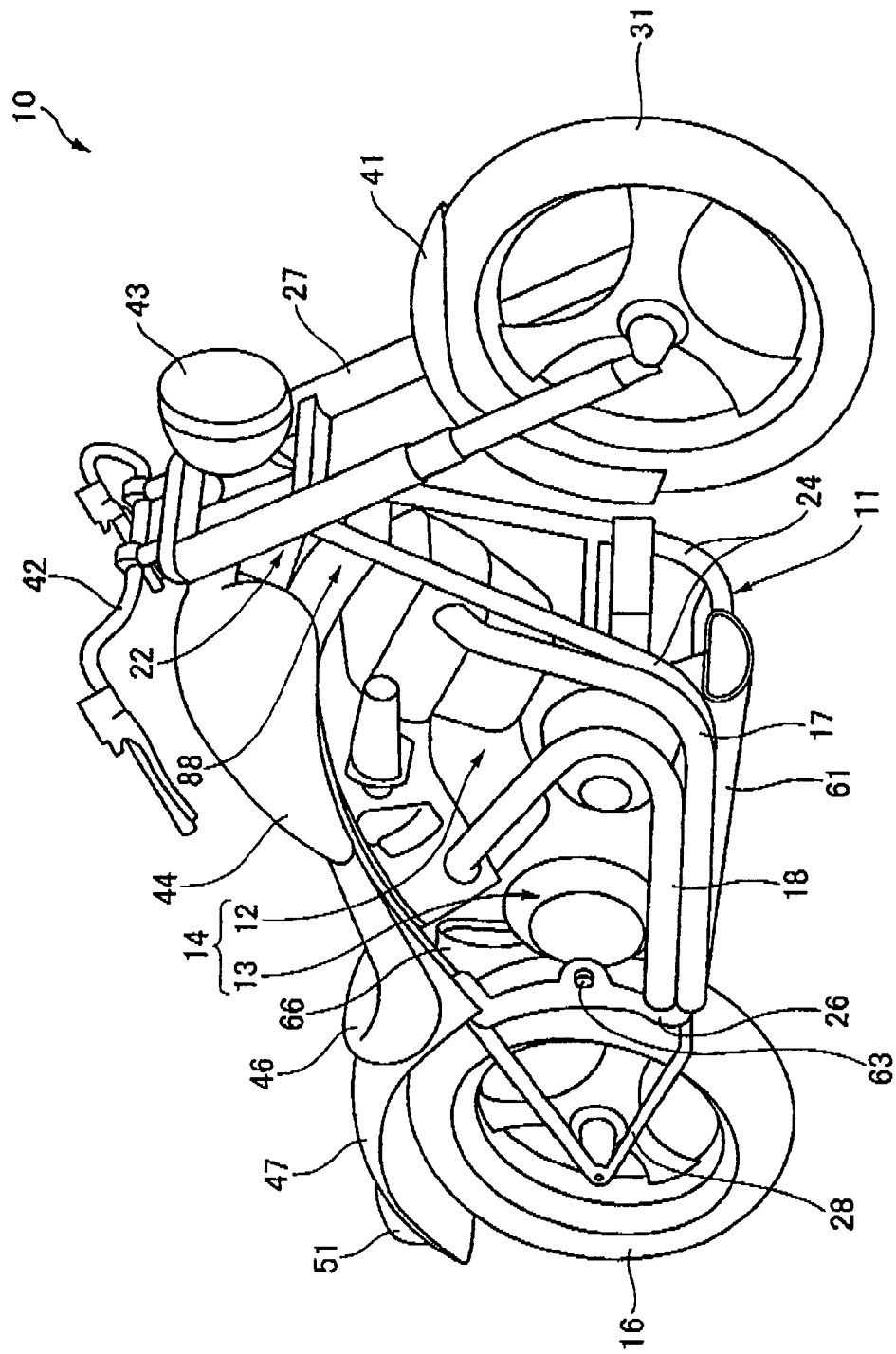
FIG. 1 is a perspective view of a motorcycle which adopts a radiator arranging construction according to a first embodiment of the invention.

Best modes for carrying out the invention will be described hereinafter based on the accompanying drawings. Note that the drawings are to be seen in a direction in which reference numeral stand properly.

First Embodiment

FIG. 1 is a perspective view of a motorcycle which adopts a radiator arranging construction according to the invention, and a motorcycle 10 is an American type vehicle in which a power unit 14 which is made up of a water-cooled engine 12 and a transmission 13 is installed, a radiator (not shown but will be described in detail later on) is arranged between the engine 12 and a rear wheel 16, and two exhaust pipes (a first exhaust pipe 17 and a second exhaust pipe 18) which extend from the engine 12 are shortened.

With this type of vehicle, since there is a tendency that users prefer air-cooled engines to water-cooled ones, in the event that the radiator is made less conspicuous externally, the design characteristic of the vehicle is increased.

Figure 2:
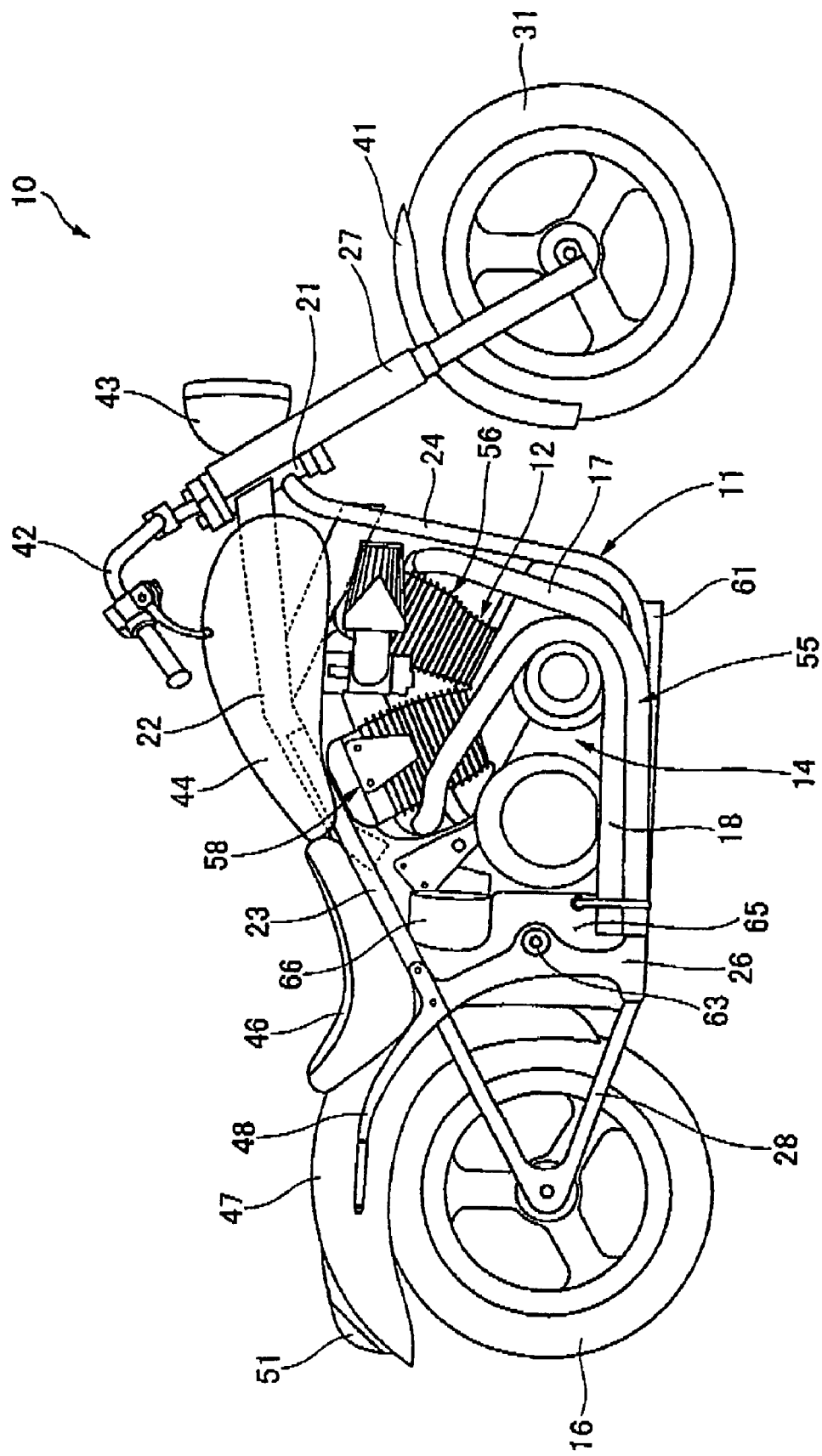
FIG. 2 is a side view of the motorcycle according the first embodiment of the invention.

FIG. 2 is a side view of the motorcycle according to the invention, and the motorcycle 10 is a vehicle in which a body frame 11 is made up of a headpipe 21, a pair of left and right main frames 22 (only one of the main frames 22 is shown. Hereinafter, as to pairs of components which are each made up of left and right constituent elements, reference numerals are shown only for one of them) which extend rearwards while inclined downwards from the headpipe 21, a pair of left and right seat rails 23 which extend further rearwards from the main frames 22 while inclined downwards, a pair of left and right lower or down tubes 24 which extend from the headpipe 21 substantially downwards and then rearwards and a pair of left and right pivot plates 26 which connect between rear ends of the seat rails 23 and rear ends of the down tubes 24, a front fork 27 is mounted on the headpipe 21 in a steerable fashion, and a swing arm 28 is mounted on the pivot plates 26. In addition, a front wheel 31 is mounted at a lower end of the fork 27, and the rear wheel 16 is mounted at a rear end of the swing arm 28.

Here, reference numeral 41 denotes a front mudguard which covers a top of the front wheel 31, 42 a handlebar mounted at an upper end of the front fork 27, 43 a headlamp, 44 a fuel tank mounted on the main frames 22, 22, 46 a seat mounted on the seat rails 23, 23, 47 a rear mudguard which covers top and front of the rear wheel 16, 48 a pair of left and right mudguard stays mounted to the left and right seat rails 23, respectively, for supporting the rear mudguard 47, and 51 a tail lamp.

The engine 12 is a V-type engine, and an exhaust system 55 of this engine is made up of the first exhaust pipe 17 which extends from a front cylinder 56 substantially downwards and then rearwards, the second exhaust pipe 18 which extends from a rear cylinder 58 forwards while inclined downwards and then rearwards and a muffler (not shown) that is disposed below the power unit 14 for connection to the first exhaust pipe 17 and the second exhaust pipe 18, and rear ends of the first exhaust pipe 17 and the second exhaust pipe 18 are made to extend to a position below a pivot shaft 63 that is mounted on the left and right pivot plates 26 so as to support the swing arm 28 in such a manner as to freely swing. Note that reference numeral 61 denotes an undercover which covers the periphery of the muffler.

In a conventional exhaust system, while exhaust pipes and a muffler are made to extend as far as a side of the rear wheel, in the invention, the rear ends of the first exhaust pipe 17 and the second exhaust pipe 18 are disposed in the vicinity of the pivot shaft 63. Consequently, the side of the rear wheel 16 is not covered by the exhaust pipes and the muffler, a simplified impression can be imparted to the external appearance of the rear wheel 16. Furthermore, since substantially the whole of the rear wheel 16, which has an improved design characteristic, looks similar to the front wheel 31, the external appearance of the vehicle can be improved.

A space in the figure defined between the engine 12 or, to be specific, the power unit 14 and the rear wheel 16 is a space where the radiator (not shown) is arranged, and the space is covered by side covers 65 on both sides thereof, and an intake duct 66 is provided on each of the side covers 65.

Figure 3:
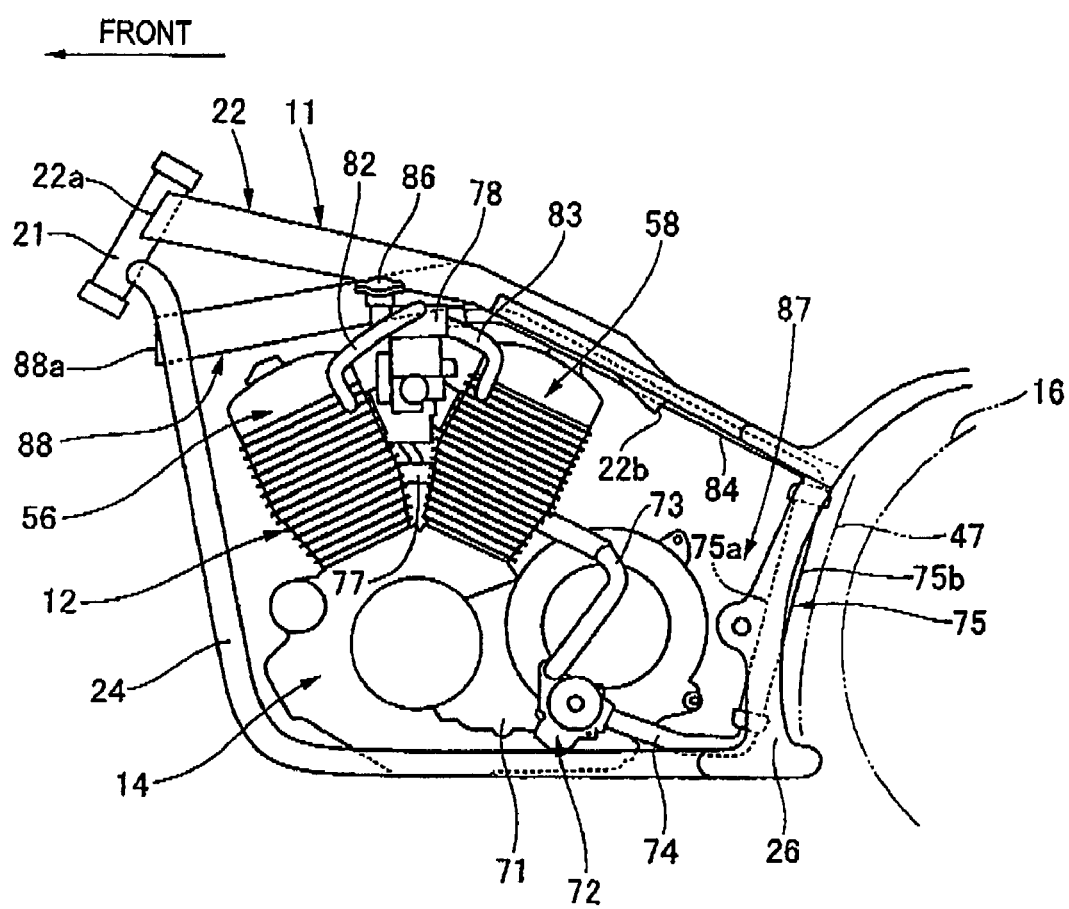
FIG. 3 is a side view of a main part of the motorcycle according to the first aspect of the invention.

FIG. 3 is a side view of a main part of the motorcycle according to the invention and shows mainly a left side of the body frame 11 and the power unit 14. Note that an arrow (FRONT) in the figure denotes the front of the vehicle.

The power unit 14 includes a water pump 72 on a side of a crankcase 71, and this water pump 72 connects to the rear cylinder 58 of the engine 12 via a discharge piping 73 and to a lower end of the radiator 75 via a suction piping 74.

Here, reference numeral 77 denotes a first coolant piping which connects to both the front cylinder 56 and the rear cylinder 58, 78 a collecting portion disposed between the front cylinder 56 and the rear cylinder 58, 82 a second coolant piping which connects the collecting portion 78 to the front cylinder 56 to the collecting portion 78, 83 a third coolant piping which connects the collecting portion 78 to the rear cylinder 58, 84 a fourth coolant piping which connects the collecting portion 78 to an upper portion of the radiator 75, and 86 a cap for an opening provided in the collecting portion 78 through which coolant is poured thereinto.

The radiator 75 is a flat, rectangular component that is mounted on the left and right pivot plates 26 so as to be arranged between the left and right pivots plates 26 and is arranged in such a manner that a front surface 75a and a rear surface 75b extend in a transverse direction of the vehicle, that is, in such a manner that the front surface 75a is directed in a longitudinal direction of the vehicle while inclined in such a manner that the upper portion is positioned further longitudinally rearward than a lower portion thereof.

Namely, the radiator 75 is such as to be arranged in the space 87 defined between the engine 12 and the rear wheel 16 or, to be specific, between the power unit 14 and the rear wheel 16.

The main frame 22 is a member that is formed hollow so as to be a duct by opening a front end portion 22a and a rear end portion 22b thereof, so that running air is taken thereinto from the front end portion 22a and is then discharged from the rear end portion 22b so as to be guided to the radiator 75.

In the figure, reference numeral 88 denotes a center duct that is mounted between the left and right main frames 22 and in which an opened front end portion 88a is arranged between the left and right down tubes 24, whereas an opened rear end portion 88b (not shown) is provided in the vicinity of the rear end portions 22b of the main frames 22.

Figure 4:
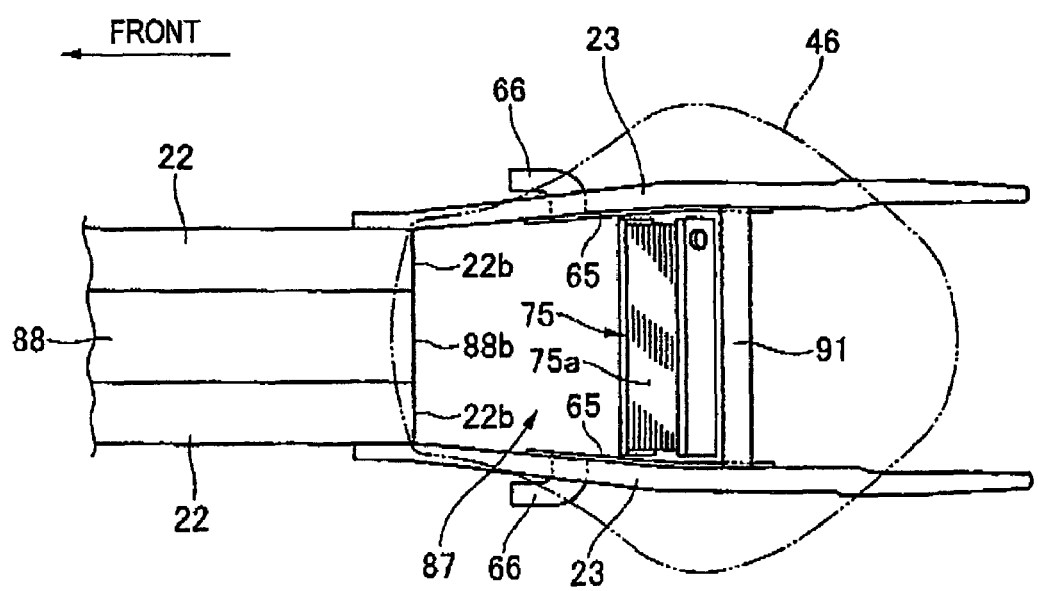
FIG. 4 is a plan view of the main part of the motorcycle according to the first embodiment of the invention.

FIG. 4 is a plan view of the main part of the motorcycle according to the invention, in which the center duct 88 is mounted between the left and right main frames 22, 22, the rear end portions 22b, 22b, 88b of the main frames 22, 22 and the center duct 88 are aligned, the seat rails 23, 23, which are attached to the left and right main frames 22, 22, respectively, are mounted, the radiator 75 is arranged between the seat rails 23, 23 as viewed from the top, and the intake ducts 66 are mounted, respectively, on the side covers 65, 65 which are situated inside the seat rails 23, 23 as viewed from the top. Note that reference numeral 91 denotes a crossmember which is extended between the left and right seal rails 23, 23 to be mounted thereat, and 46 the seat.

Figure 5B:
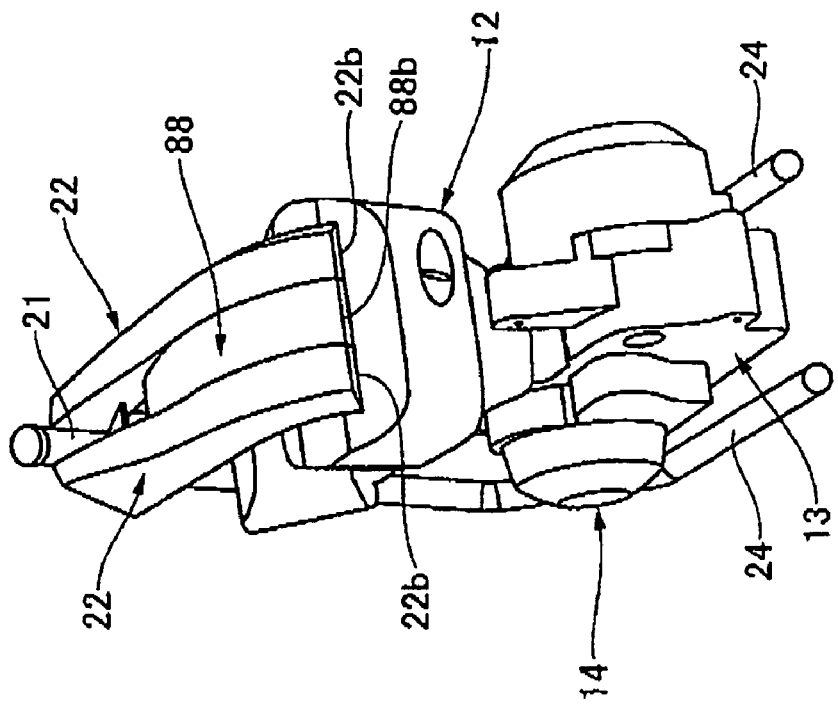
FIG. 5 is a perspective view which explains a body frame according to the first embodiment of the invention.
Figure 5A:
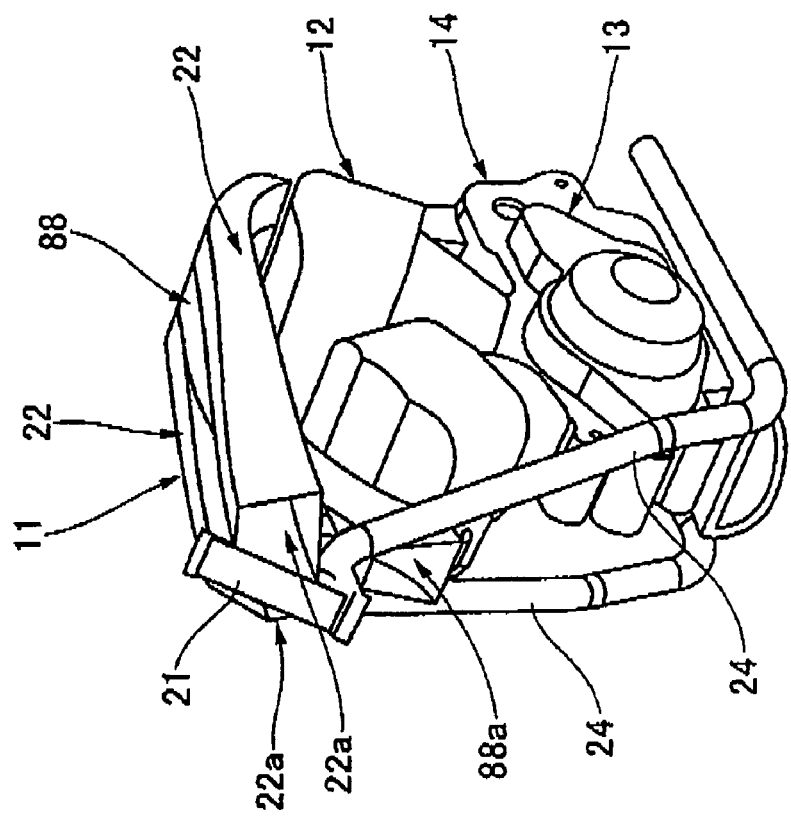

FIGS. 5A, 5B are perspective views of the body frame according to the invention.

In FIG. 5A, the main frame 22 which makes up the body frame 11 is a member whose end portion 22a, which functions as an opening, is formed into a trapezoidal shape, and the center duct 88 is a member in which a rear portion thereof is mounted between the left and right main frames 22, 22, whereas the front end portion 88a, which functions as an opening, is formed into a trapezoidal shape and is arranged between the left and right down tubes 24.

FIG. 5B shows that the rear portions of the main frames 22, 22 and the center duct 88 are curved similarly so that the rear end portions 22b, 22b, 88b, which function as the openings thereof, are oriented obliquely downwardly rearwards.

The function of the radiator arranging construction that has been described heretofore will next be described.

Figure 6:
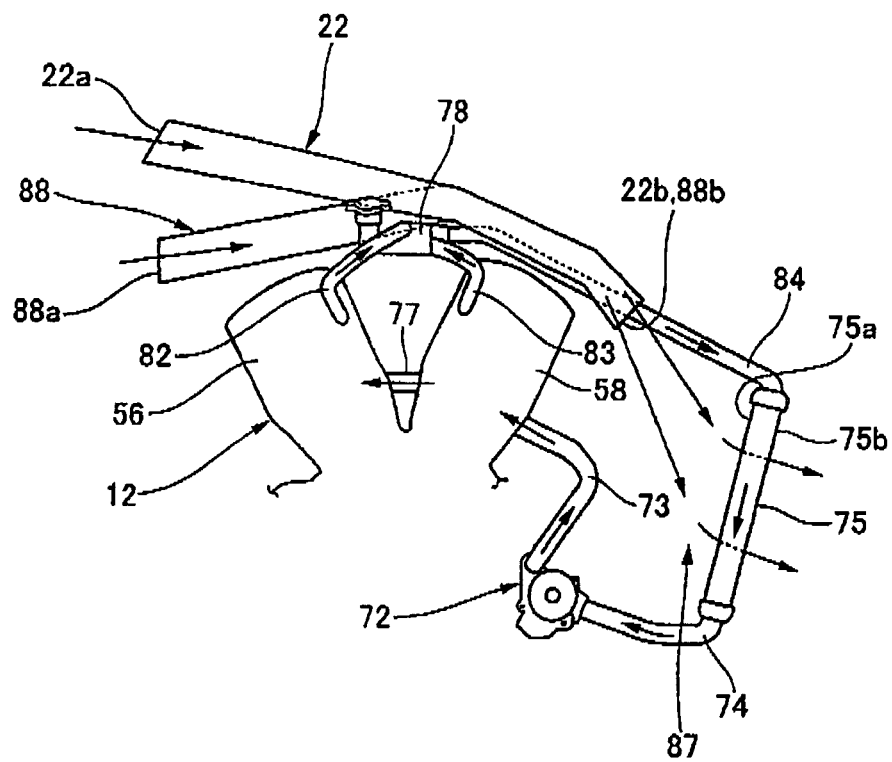
FIG. 6 is a first function diagram which shows the function of the radiator arranging construction according to the first embodiment of the invention.

FIG. 6 is first function diagram which shows the function of the radiator arranging construction according to the invention.

When the engine 12 is started, the water pump 72 is activated to generate a flow of coolant which flows therefrom, as indicated by arrows, through the discharge piping 73, a water jacket within the rear cylinder 58, the first coolant piping 77, a water jacket within the front cylinder 56, the second coolant piping 82 to the collecting portion 78 in that order (coolant flows from the rear cylinder 58 via the third coolant piping 83 to the collecting portion 78 in that order), then continues to flow from the collecting portion 78 to the radiator 75 via the fourth coolant piping 84 and, furthermore, returns from the radiator 75 to be absorbed back into the water pump 72 via the suction piping 74.

Then, when the vehicle starts to run, running air can be taken from the front end portions 22a of the main frames 22 and the front end portion 88a of the center duct 88 into the interiors of the main frames 22 and the center duct 88, as indicated by arrows, and the running air so taken in is then blown out into the space 87 from the rear end portions 22b, 88b of the main frames 22 and the center duct 88 so as to be passed through the radiator 75 to cool down the radiator 75.

Figure 7:
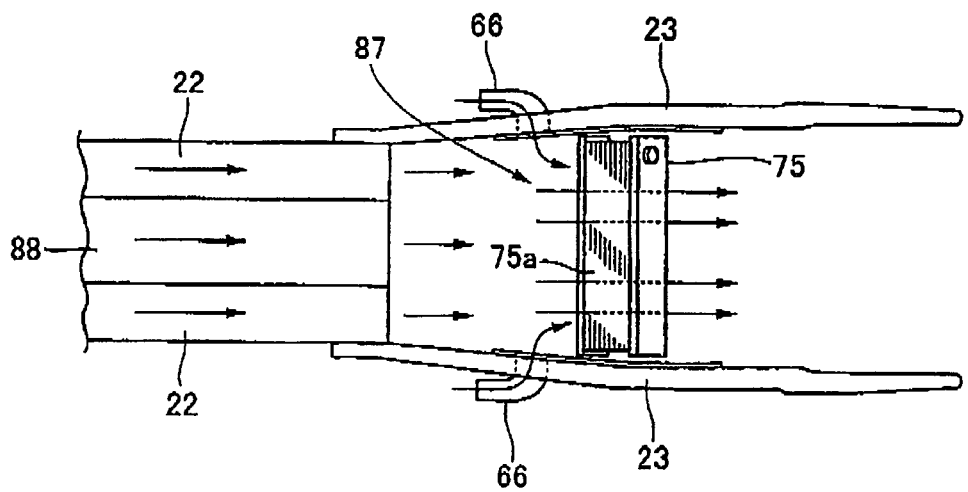
FIG. 7 is a second function diagram which shows the function of the radiator arranging construction according to the first embodiment of the invention.

FIG. 7 is a second function diagram which shows the function of the radiator arranging construction according to the invention.

The running air that is taken in as described above flows, as shown by arrows, from the interiors of the main frames 22, 22 and the center duct 88 into the space 87, while other running air flows from the sides of the body into the space 87 via the left and right intake ducts 66, 66 so as to be passed through the radiator 75 to cool down the radiator 75.

As has been described above as to FIGS. 2 and 3, according to a first aspect of the invention according to the first embodiment, in the motorcycle 10 having installed thereon the water-cooled engine 12, the radiator 75 is arranged erect in the space 87 defined between the engine 12 and the rear wheel 16 so as to be supported by the body frame 11 or, to be specific, the pair of left and right pivot plates 26 in such a manner that the front surface 75a which functions as the cooling surface of the radiator 75 is directed in the longitudinal direction of the vehicle.

Since the radiator 75 is arranged in the space 87 defined between the engine 12 and the rear wheel 16, the radiator 75 can be made difficult to see from the outside compared with a case where the radiator is arranged at the front of the body frame. Furthermore, since the radiator 75 is arranged erect in such a manner that the front surface 75a, which functions as the cooling surface of the radiator 75, is directed in the longitudinal direction of the vehicle, the radiator 75 is visible only in thickness from the sides of the vehicle (in FIG. 3, most of the side of the radiator 75 is covered by the pivot plate 26 and hence the radiator 75 is almost invisible from the side of the vehicle), and hence the radiator 75 can be made less conspicuous. Consequently, the radiator 75 is made difficult to be exposed to the outside, and moreover, since the engine 12 is not covered by the radiator 75, the external appearance characteristic of the motorcycle 10 can be improved when the design characteristic of the engine 12 is enhanced.

In addition, since the radiator 75 is fixed to the body between the engine 12 and the rear wheel 16, there is no case where the radiator 75 becomes movable, and hence the degree of freedom in designing coolant piping is increased and the mounting structure becomes simplified.

According to a second aspect of the invention of the first embodiment, in the respective configurations, the space 87 is preferably covered on the sides thereof by the side covers 65, 65 (only the reference numeral 65 for one on the near side is shown) which function as covers.

Since the space 87 in which the radiator 75 is arranged is covered on the sides thereof by the side covers 65, the radiator 75 is made not to be exposed to the outside, whereby there is provided no impression that the water-cooled engine 12 is installed. For example, in case fins like those actually fitted on an air-cooled engine are provided on the water-cooled engine 12, there can be provided an impression that an air-cooled engine is installed on the vehicle.

According to a third aspect of the invention of the first embodiment, in the respective configurations, the pair of left and right main frames 22 are preferably caused to extend rearwards from the headpipe 21 which supports the front fork 27 in a steerable fashion, and interiors of the main frames 22 are formed into ducts, so that running air is guided into the space 87 from the vicinity of the headpipe 21 through the interiors of the main frames 22.

The amount of running air that is guided into the space 87 between the engine 12 and the rear wheel 16 can be increased by the main frames 22 whose interiors are formed into ducts, thereby making it possible to promote the cooling down of coolant by the radiator 75.

As shown in FIGS. 3 and 4, according to a fourth aspect of the invention of the first embodiment, in the respective configurations, the intake duct 66 is preferably provided on the side cover 65 for guiding running air into the space 87.

A larger amount of running air can be guided into the space 87 by the intake ducts 66 provided on the side covers 65, whereby the cooling of coolant by the radiator 75 can be promoted further.

According to a fifth aspect of the invention of the first embodiment, in the respective configurations, the radiator 75 is preferably supported by the body frame 11 or, to be specific, by the left and right pivot plates 26 (only the reference numeral 26 for one on the near side is shown).

Since the radiator 75 is made to be supported by the left and right pivot plates 26, the radiator 75 can be supported strongly and rigidly by these pivot plates 26, 26.

According to a sixth aspect of the invention of the first embodiment, in the respective configurations, since the radiator 75 is preferably arranged so as to substantially coincide with the left and right pivot plates 26, 26 as viewed from the side, the radiator 75 is made difficult to be seen from the side by the left and right pivot plates 26, 26, thereby making it possible to improve the external appearance characteristic of the motorcycle 10.

Second Embodiment

Figure 8:
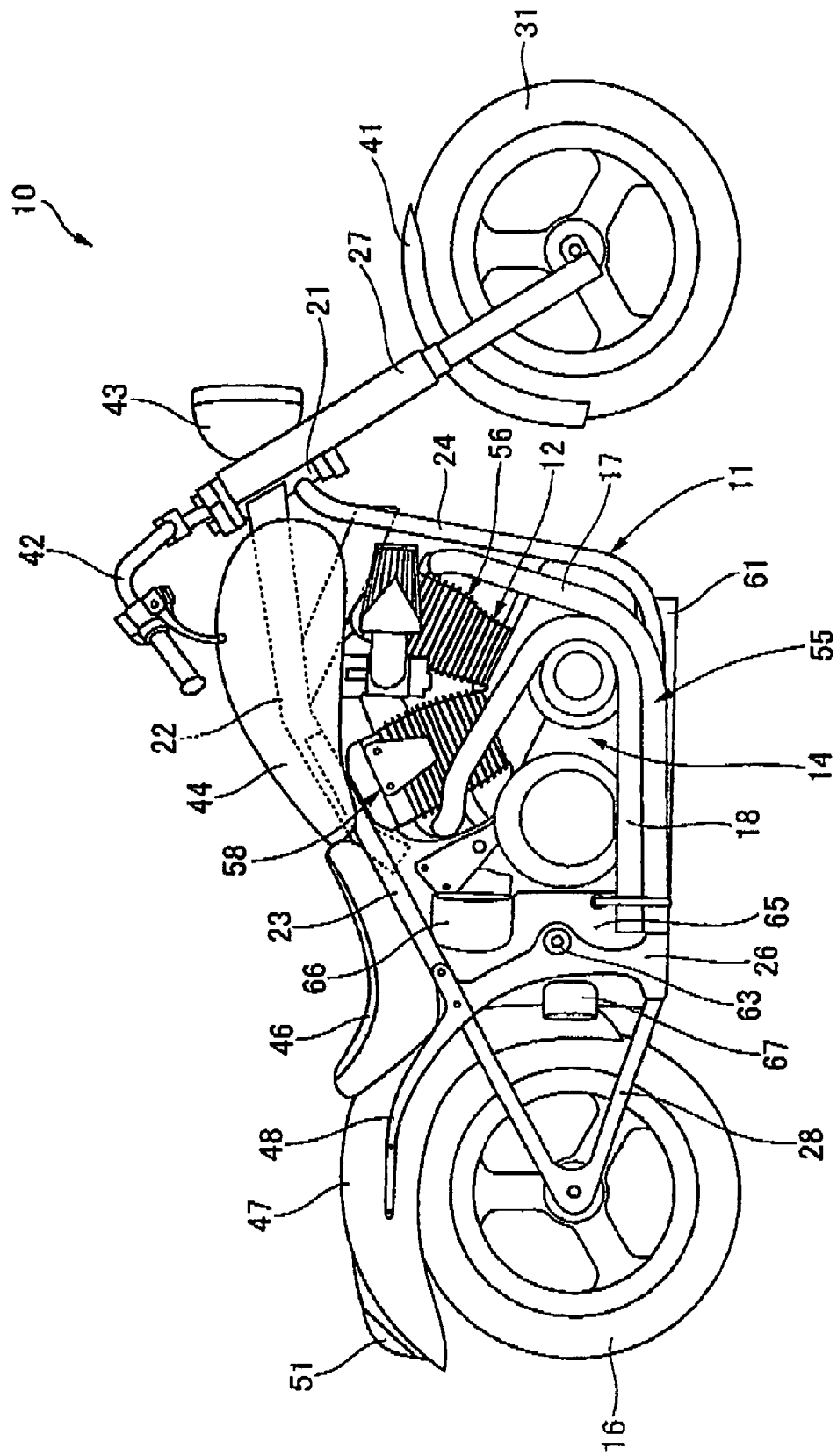
FIG. 8 is a side of a motorcycle according to a second embodiment of the invention.

FIG. 8 is a side view of a motorcycle according to a second embodiment of the invention and corresponds to FIG. 2 which shows the motorcycle according to the first embodiment of the invention. Like reference numerals are imparted to like members, and only matters will be described below which are different from those described in the first embodiment.

In the figure, a space between an engine 12 or, to be specific, a power unit 14 and a rear wheel is a space where a radiator (not shown) is arranged, and the space is covered on both sides thereof by side covers 65, and an intake duct 66 and an exhaust duct 67 are provided on each of the side covers 65.

Figure 9:
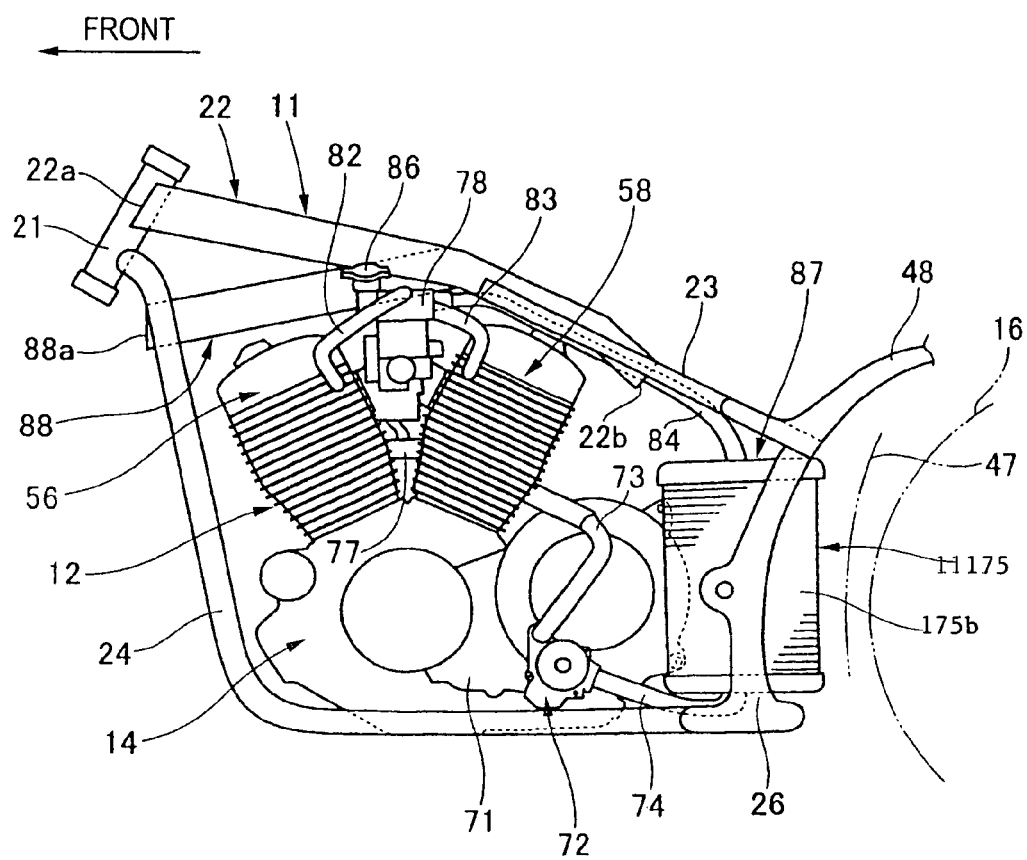
FIG. 9 is a side view of a main part of the motorcycle according to the second embodiment of the invention.

FIG. 9 is a side view of a main part of a motorcycle according to the second embodiment of the invention, which shows a left side of a body frame 11 and the power unit 14. Note that FIG. 9 corresponds to FIG. 3 which shows the first embodiment.

Radiators 175, 175 (only the reference numeral 175 for one on the near side is shown) are flat rectangular components which are mounted on the left and right pivot plates 26 so as to be arranged between the left and right pivot plates 26 and are arranged in such a manner that an internal surface 175a (not shown) and an external surface 175b of each of the radiators 175, 175 extend substantially in the longitudinal direction of the vehicle. Namely, the radiators 175, 175 are arranged to erect in such a manner that the internal surface 175a and the external surface 175b are directed substantially to the side of the vehicle (to be specific, upper portions and lower portions of the respective radiators 175 are attached to the pivot plates 26.).

Namely, the radiators 175 are arranged in the space 87 defined between the engine 12 and the rear wheel 16 or, to be specific, between the power unit 14 and the rear wheel 16.

Figure 10:
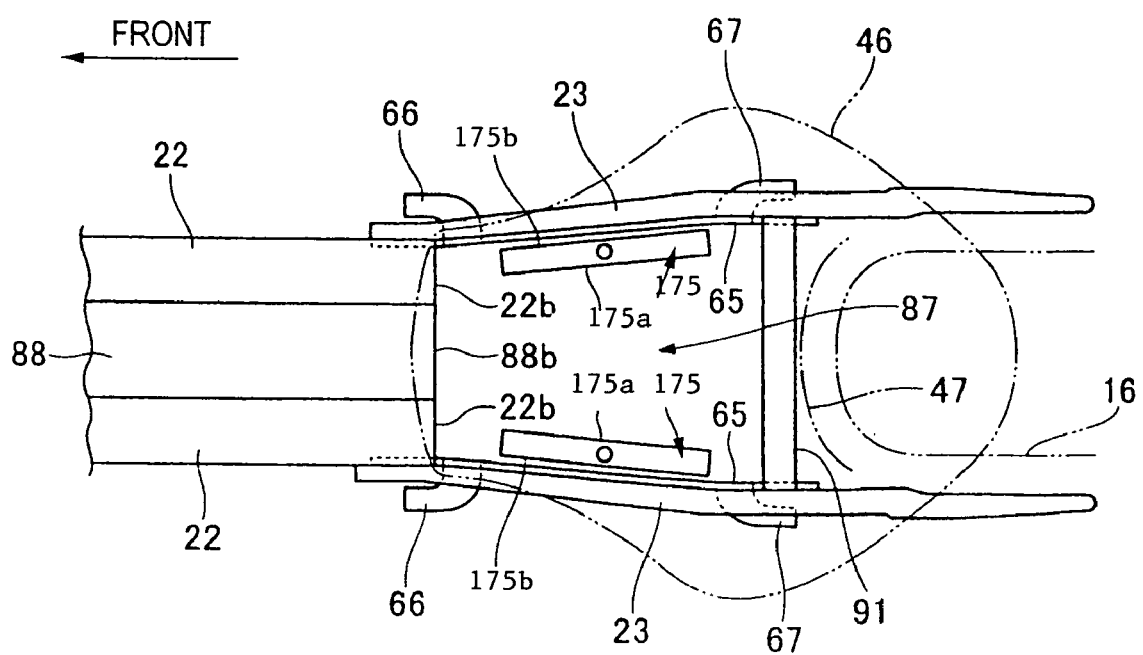
FIG. 10 is a plan view of the main part of the motorcycle according to the second embodiment of the invention.

FIG. 10 is a plan view of the main part of the motorcycle according to the invention, in which a center duct 88 is mounted between left and right main frames 22, 22, rear end portions 22b, 22b, 88b of the main frames 22, 22 and the center duct 88 are aligned, seat rails 23, 23 which are mounted, respectively, on the left and right main frames 22, 22 are mounted, the radiators 175, 175 are arranged between the seat rails 23, 23 in such a manner as to follow the seat rails 23, 23, respectively, as viewed from the top, and the intake ducts 66 and the exhaust ducts 67 are mounted, respectively, on the side covers 65, 65 which are situated inside the seat rails 23, 23, as viewed from the top. Note that reference numeral 91 denotes a crossmember that is extended between the left and right seat rails 23, 23 so as to be mounted thereat, and 46 a seat.

The function of the radiator arranging construction that has just been described will next be described.

Figure 11:
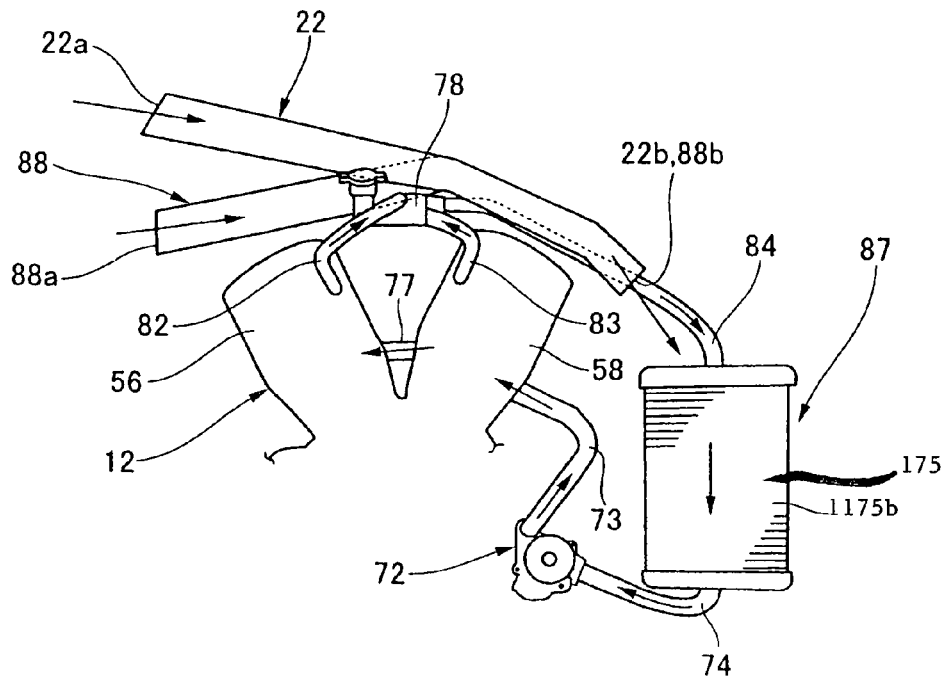
FIG. 11 is a first function diagram which shows a function of a radiator arranging construction according to the second embodiment of the invention.

FIG. 11 is a first function diagram which shows the function of the radiator arranging construction according to the second embodiment of the invention.

When the engine 12 is started, a water pump 72 is activated to generate a flow of coolant which flows therefrom, as indicated by arrows, through a discharge piping 73, a water jacket in a rear cylinder 58, a first coolant piping 77, a water jacket within a front cylinder 56, a second coolant piping 82 to a collecting portion 78 in that order (coolant flows from the rear cylinder 58 via a third coolant piping 83 to the collecting portion 78 in that order), then continues to flow from the collecting portion 78 to the radiators 175 via a fourth coolant piping 84 and, furthermore, returns from the radiators 175 to be absorbed back into the water pump 72 via a suction piping 74.

Then, when the vehicle starts to run, running air can be taken from front end portions 22a of the main frames 22 and a front end portion 88a of the center duct 88 into the interiors of the main frames 22 and the center duct 88, as indicated by arrows, and the running air so taken in is then blown out into the space 87 from rear end portions 22b, 88b of the main frames 22 and the center duct 88 so as to be passed through the radiators 175 to cool down the radiators 175.

Figure 12:
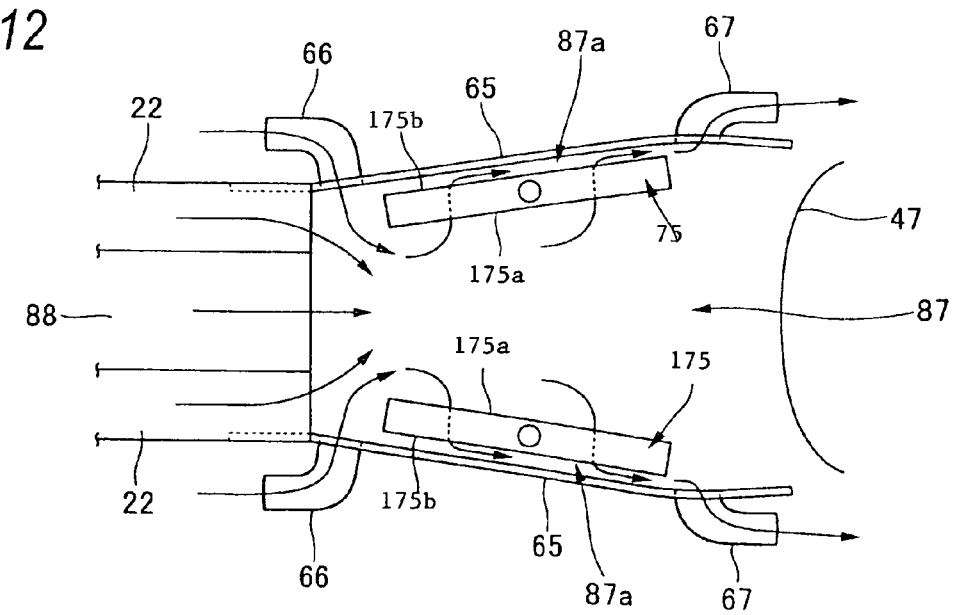
FIG. 12 is a second function diagram which shows the function of the radiator arranging construction according to the second embodiment.

FIG. 12 is a second function diagram which shows the function of the radiator arranging construction according to the second embodiment of the invention.

The running air that is taken in as described above flows, as shown by arrows, from the interiors of the main frames 22, 22 and the center duct 88 into the space 87, while other running air flows from the sides of the body into the space 87 via the left and right intake ducts 66, 66 so as to be passed through the radiators 175 to cool down the radiators 175. After having passed through the radiators 175, the running air passes through spaces 87a that are defined between the radiators 175 and the side covers 67 (this space is a space that is included in the space 87) to thereby be discharged to the outside from the exhaust ducts 67, 67.

Figure 13:
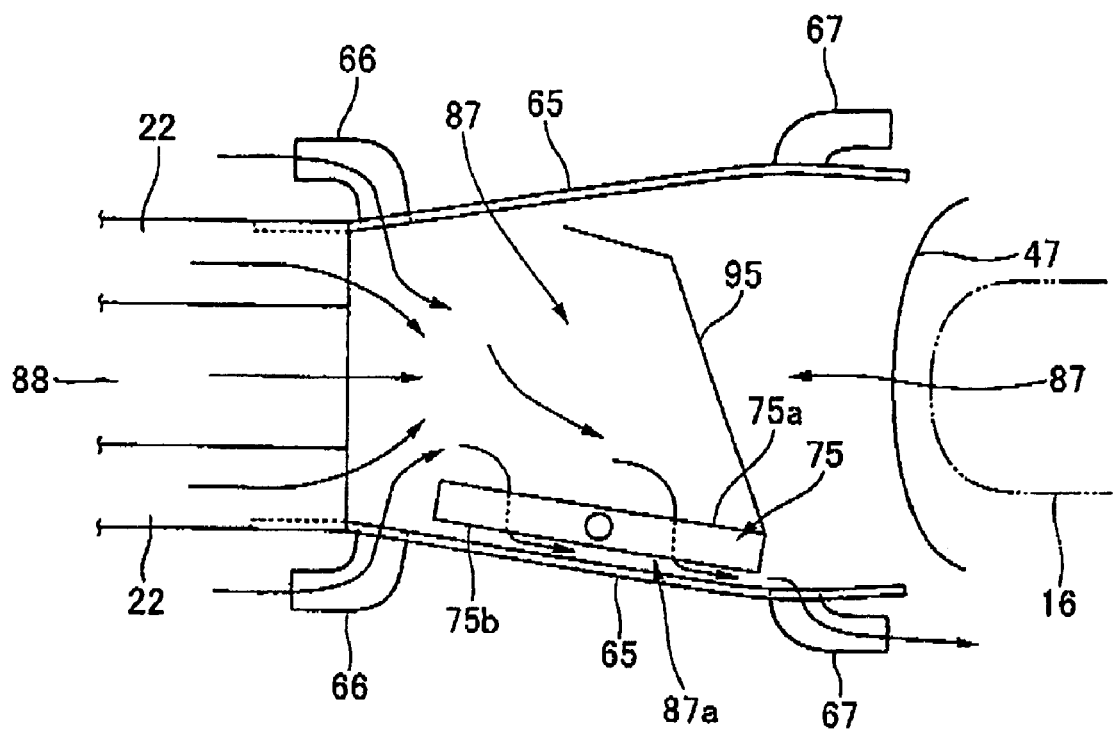
FIG. 13 is an explanatory diagram which shows another form for embodying the radiator arranging construction according to the second embodiment of the invention.

FIG. 13 is an explanatory diagram which shows another form for embodying the radiator arranging construction according to the invention, and like reference numerals are imparted to like constituent components to those of the embodying form shown in FIG. 10, the detailed description thereof being omitted.

The radiator 175 is mounted on the left and right pivot plates 26 (refer to FIG. 9) so as to be arranged between the left and right pivot plates 26 and is arranged to erect in such a manner that the internal surface 175a and the external surface 175a of the radiator 175 are directed substantially to the side of the vehicle.

Namely, the radiator 175 is such as to be arranged in the space 87 defined between the engine 12 (refer to FIG. 9) and the rear wheel 16 or, to be specific, between the power unit (refer to FIG. 9) and the rear wheel 16. Note that reference numeral 95 denotes a shroud that is constructed to cover a side of a rear portion of the radiator 175 to thereby deflect the flow of air within the space 87 so as to collect the air to the side of the radiator 175.

While the vehicle is running, running air flows into the space 87 from the interiors of the main frames 22, 22 and the interior of the center duct 88, as indicated by arrows and furthermore, running air flows into the space 87 from the sides of the vehicle through the left and right intake ducts 66, 66. Then, the flow direction of the running air that has so flowed in is changed by the shroud 95 so that the running air is directed to flow to the side of the radiator 175 so as to be passed through the radiator 175 to thereby cool down the radiator 175. Thus, the amount of air that passes through the radiator 175 can be increased by providing the shroud 95, thereby making it possible to enhance the cooling capability by the radiator 175.

After having passed through the radiator 175, the running air passes through the space 87a (this is a space that is included in the space 87.) defined between the radiator 175 and the side cover 65 to thereby be discharged to the outside from the one of the exhaust ducts 67.

Thus, as has been described by reference to FIGS. 8 and 9, according to a first aspect of the invention of the second embodiment, in the motorcycle 10 having installed thereon the water-cooled engine 12, the radiators 175 are arranged erect in the space 87 defined between the engine 12 and the rear wheel 16 in such a manner that the internal surfaces 175*a* and the external surfaces 175*b*, which function as the cooling surfaces of the radiators 175, are directed substantially to the side of the vehicle.

Since the radiators 175 are arranged in the space 87 between the engine 12 and the rear wheel 16, the radiators 175 can be made difficult to see from the outside compared with a case where the radiators are arranged at the front of the body frame. Consequently, the radiators 175 are made difficult to be exposed to the outside, and moreover, since the engine 12 is not covered by the radiators 175, the external appearance characteristic of the motorcycle 10 can be improved when the design characteristic of the engine 12 is enhanced.

According to a second aspect of the invention of the second embodiment, the radiators 175 are arranged on the left and right sides of the body, respectively.

Since the radiators 175 are arranged on the left and right sides of the body, respectively, each of the radiators 175 can be made small in size, and even in case the space 87 is narrow, the radiators 175 can be arranged easily and efficiently, thereby making it possible to make the motorcycle 10 compact and small in size.

According to a third aspect of the invention of the second embodiment, as has been described by reference to FIGS. 8 and 10, the exhaust ducts 67 are provided on the sides of the space 87, so that air on a downstream side of the space 87 is discharged to the outside through the exhaust ducts 67.

Since the exhaust ducts 67 are provided on the sides of the space 87, air on the downstream side of the space 87 is discharged to the outside through the exhaust ducts 67, and hence, the amount of air that passes through the radiators 175 can be increased, thereby making it possible to enhance the cooling capability by the radiators 175.

As has been described by reference to FIGS. 9 and 10, according to a fourth aspect of the invention of the second embodiment, the pair of left and right main frames 22 are caused to extend rearwards from the headpipe 21 which supports the front fork 27 in a steerable fashion, and the interiors of the main frames 22 are formed into ducts, so that running air is guided into the space 87 from the vicinity of the headpipe 21 through the main frames 22.

The amount of running air that is guided into the space defined between the engine 12 and the rear wheel 16 can be increased, thereby making it possible to promote the cooling of coolant by the radiators 175.

According to a fifth aspect of the invention of the second embodiment, as has been described by reference to FIGS. 10 and 13, the radiator 175 is arranged to follow the pair of left and right seat rails 23 that are attached to the rear portions of the main frames 22 inside the seat rails 23, as viewed from the top.

Since the radiator 175 is arranged to follow the pair of left and right seat rails 23 that are attached to the rear portions of the main frames 22 inside the seat rails 23, the air that passes through the radiator 175 is allowed to flow efficiently, and the area of the cooling portion of the radiator 175 can be secured while contributing to the reduction in the transverse width of the motorcycle 10 (refer to FIG. 8), thereby making it possible to enhance the cooling capability by the radiator 175.

Note that while, in the embodiment, the main frames that pass above the engine are made to function as the ducts for guiding running air into the space, the invention is not limited thereto, and a duct may be provided below the engine which guides running air into the space.

Third Embodiment

Figure 14:
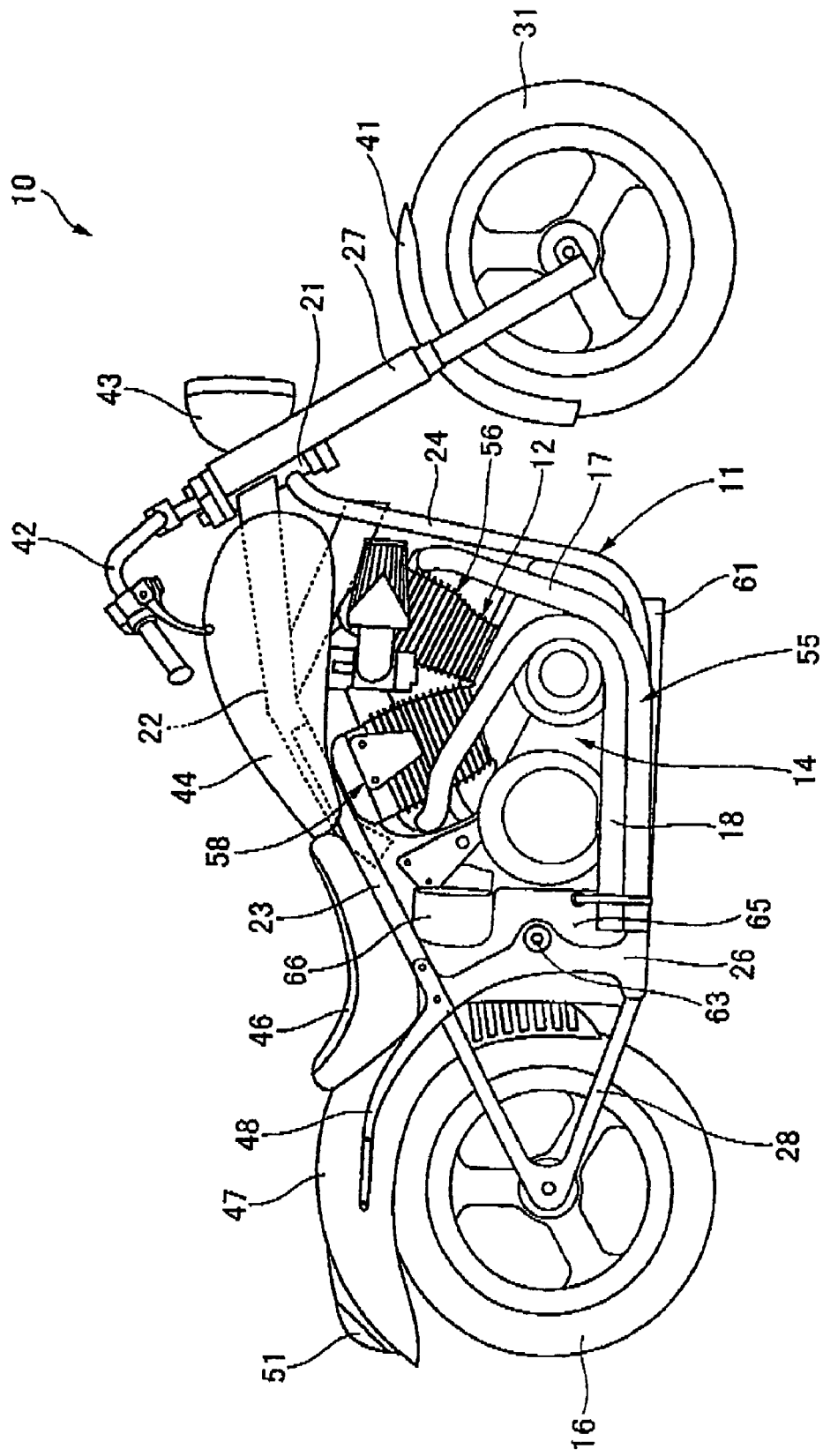
FIG. 14 is a side view of a motorcycle according to a third embodiment of the invention.

FIG. 14 is a side view of a motorcycle according to a third embodiment of the invention and corresponds to FIG. 2 which shows the first embodiment of the invention. Like reference numerals are imparted to like members, and only matters that are different from those described in the first embodiment will be described in detail herebelow.

In this embodiment, slits 101 are provided in a rear mudguard 47 which covers front and top of a rear wheel 16.

Figure 15:
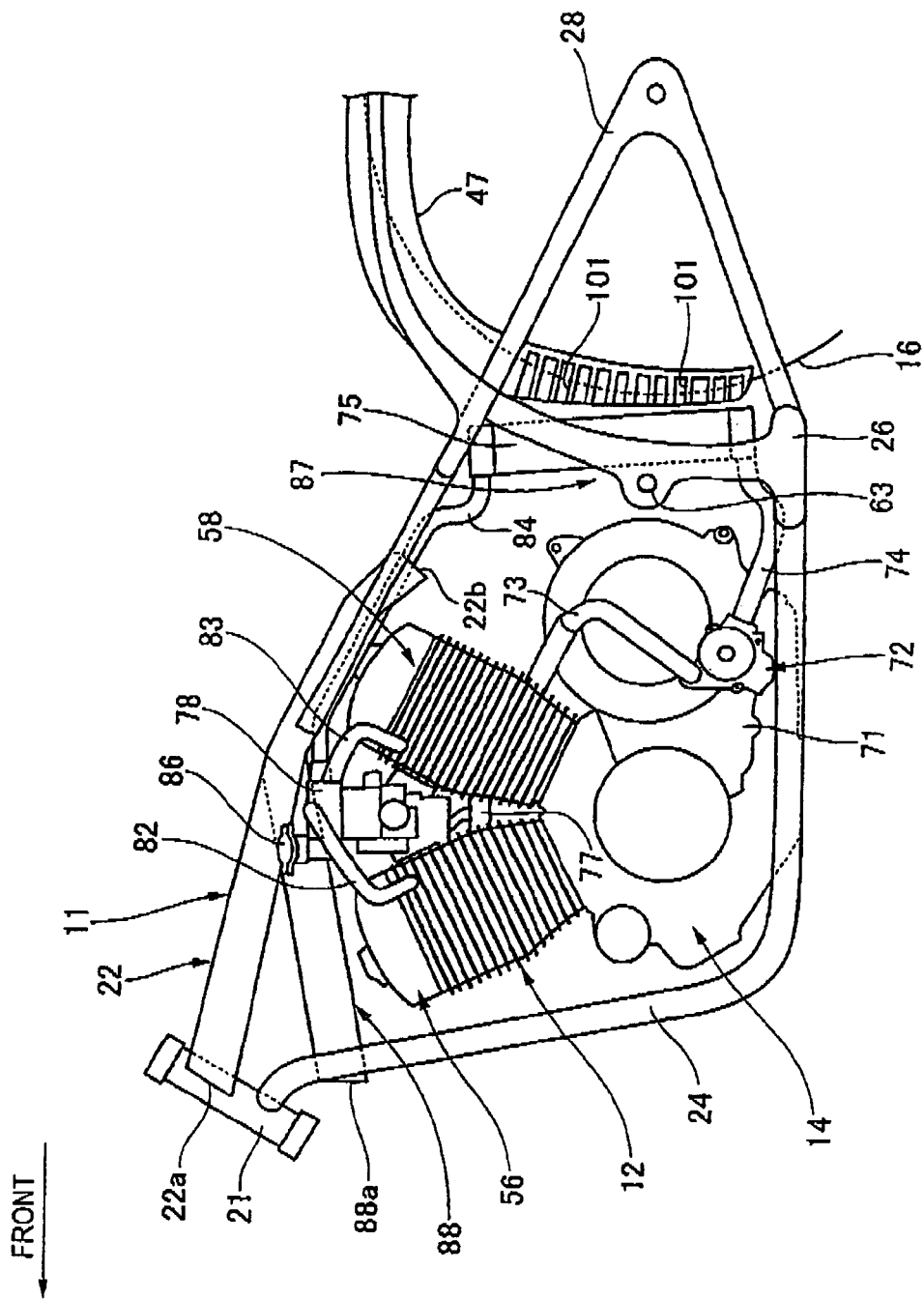
FIG. 15 is a side view of a main part of the motorcycle according to the third embodiment of the invention.

FIG. 15 is a side view of a main part of a motorcycle according to the third embodiment of the invention, which shows a left side of a body frame 11 and a power unit 14. Note that FIG. 15 corresponds to FIG. 3 which shows the first embodiment of the invention.

A radiator 75 is a flat rectangular component that is mounted on a front portion of a swing arm 28 so as to be arranged between left and right pivot plates 26 and is arranged erect in such a manner that a front surface and a rear surface of the radiator 75 extend in the transverse direction of the vehicle.

Namely, the radiator 75 is arranged in a space 87 defined between an engine 12 and the rear wheel 16 or, to be specific, between the power unit 14 and the rear wheel 16.

Figure 16:
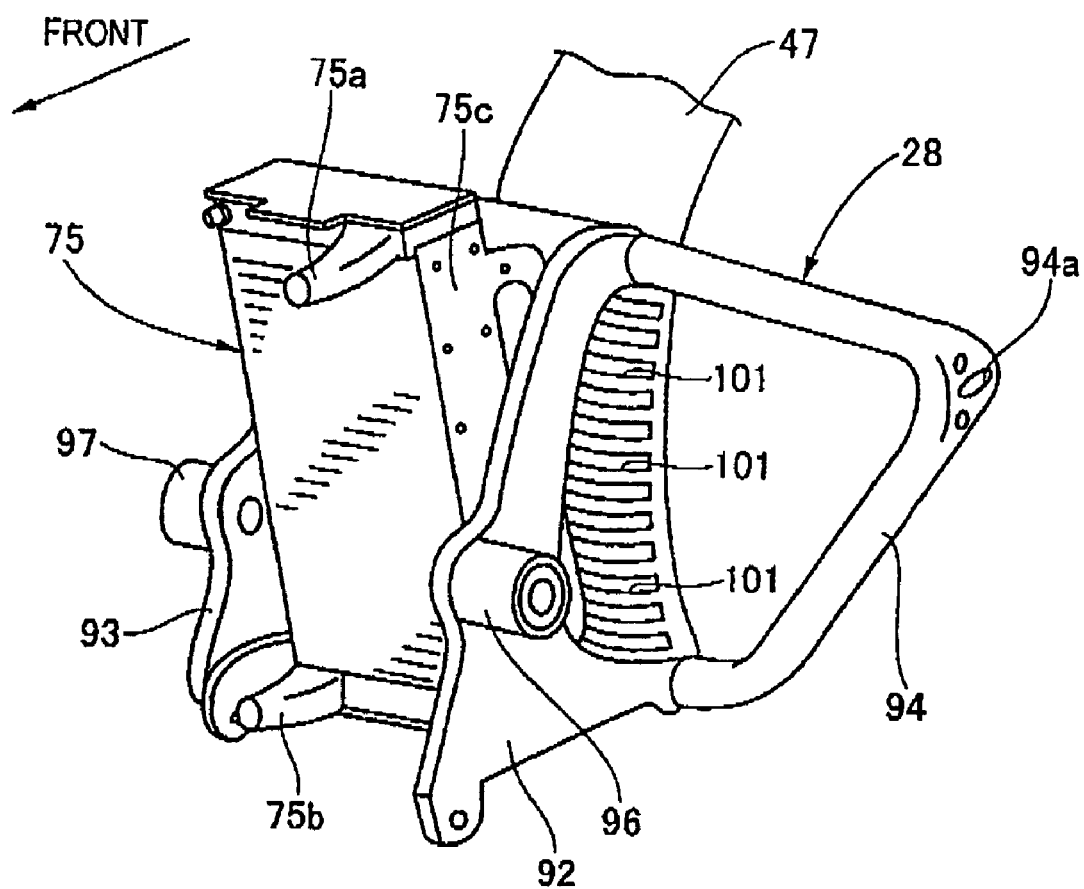
FIG. 16 is a perspective view which shows a radiator arranging construction according to the third embodiment of the invention.

FIG. 16 is a perspective view which shows a radiator arranging construction according to the third embodiment of the invention and in which the radiator 75 is shown as being mounted on the swing arm 28. Note that reference numeral 75*a* denotes an inlet tube that is provided at an upper portion of the radiator 75 for connection to the fourth coolant piping 84 (refer to FIG. 15), 75*b* an outlet tube that is provided at a lower portion of the radiator 75 for connection to the suction piping 74 (refer to FIG. 15).

The swing arm 28 is made up of a pair of left and right plate-shaped members 92, 93 that are provided forward and a pipe-shaped member 94 that is mounted on rear portions of the plate-shaped members 92, 93.

The plate-shaped members 92, 93 are members which support sides 75*c*, 75*c* (only the reference numeral 75*c* for one of the two is shown) of the radiator 75 and include bearing portions 96, 97 which are adapted to bear a pivot shaft 63 (refer to FIG. 14) in a rotatable fashion.

The pipe-shaped member 94 is a member which is formed into a V-shape as viewed from the side and which has axle mounting holes 94*a*, 94*a* (only the reference numeral 94*a* for one of the two is shown) opened in a rear end thereof for mounting an axle therein.

The rear mudguard 47 shown as being separate from the swing arm 28 in the figure has a plurality of slits 101 formed therein.

Figure 17:
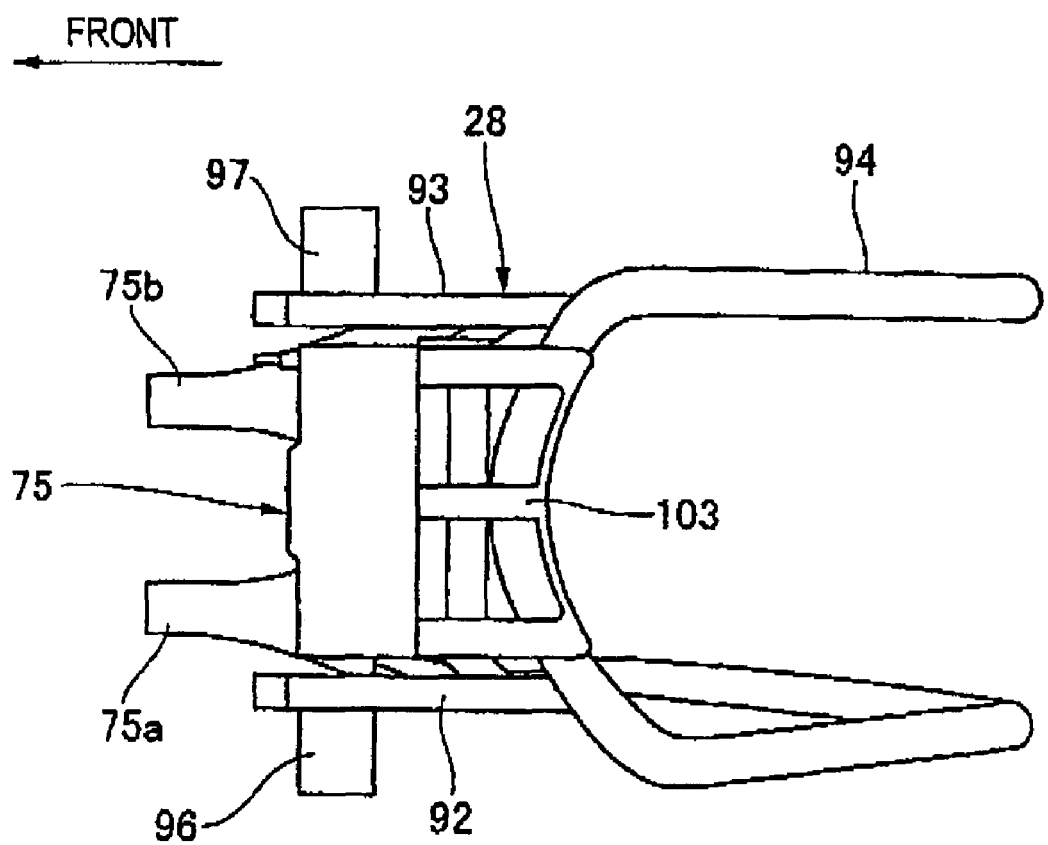
FIG. 17 is a plan view which shows the radiator arranging construction according to the third embodiment.

FIG. 17 is a plan view which shows the radiator arranging construction according to the third embodiment of the invention, and the swing arm 28 includes a support member 103 via which an upper portion of the radiator 75 is supported on the pipe-shaped member 94 that is formed substantially into a U-shape as viewed from the top on a rear side thereof, and the radiator 75 is supported strongly and rigidly at three points defined by the support member 103 and the plate-shaped members 92, 93.

Figure 18:
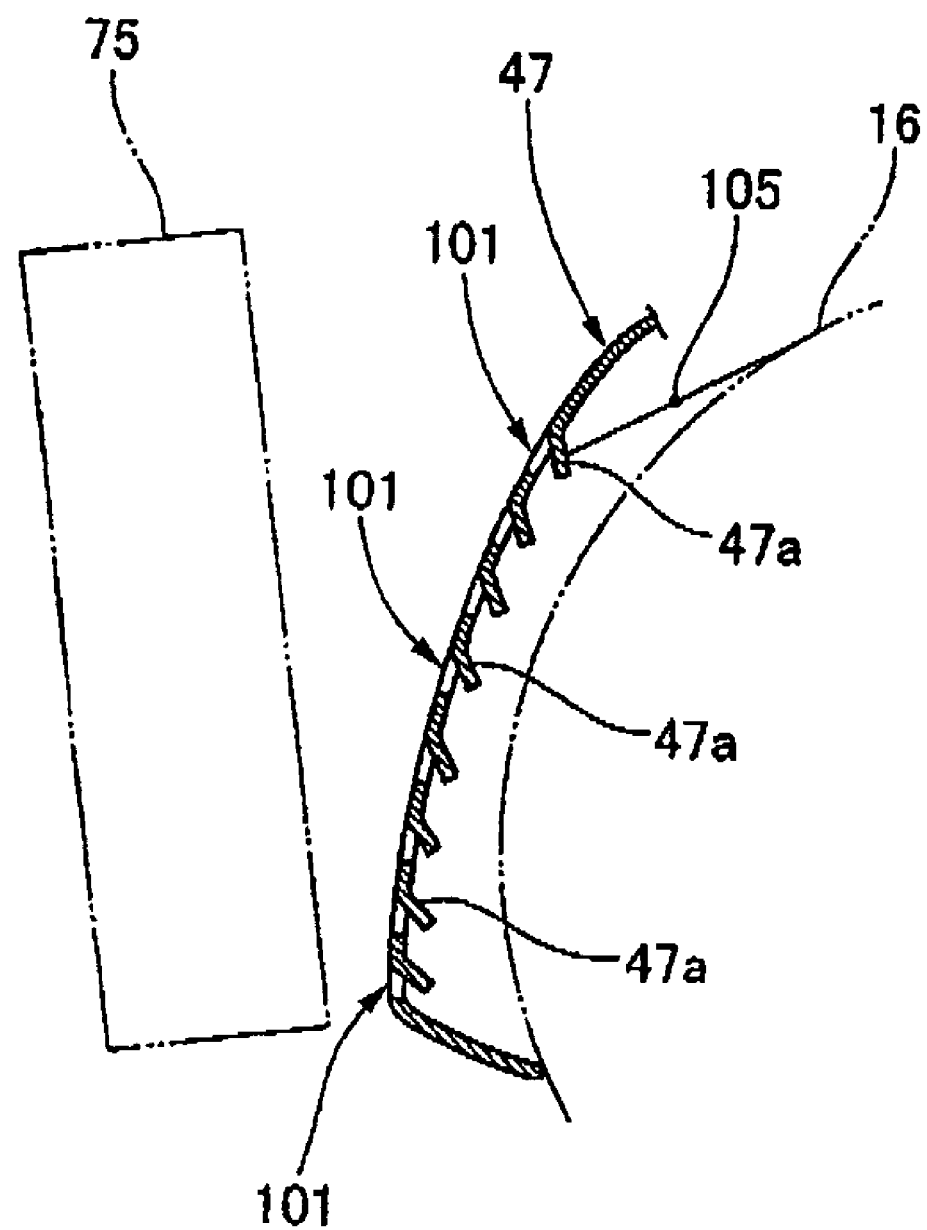
FIG. 18 is a sectional view of a rear mudguard according to the third embodiment of the invention.

FIG. 18 is a sectional view of the rear mudguard according to the embodiment of the invention, and the slits 101 are horizontally elongated openings that are formed between a plurality of bent portions 47*a* when the bent portions 47*a* are formed by providing a plurality of substantially horizontal cuts in the rear mudguard 47 and, thereafter, bending portions in the vicinity of the respective cuts so provided inward of the rear mudguard 47 so as to be formed into V-shapes.

The bent portions 47a are portions that are bent to an angle at which the bent portions 47a intersect with a tangent 105 at substantially right angles when the tangent 105 is drawn from the outer circumference of the rear wheel 16, and the reason why the bent portions 47a are bent to such an angle is because in the event that mud and water adhering to the outer circumferential surface of the rear wheel 16 are scattered along the tangent 105 when the rear wheel 16 rotates counterclockwise in the figure, the mud and water so scattered are blocked by the bent portions 47a, so that the mud and water can be prevented from being scattered as far as the radiator 75 through the slits 101.

Then, the function of the radiator arranging construction that has been described heretofore will next be described.

Figure 19:
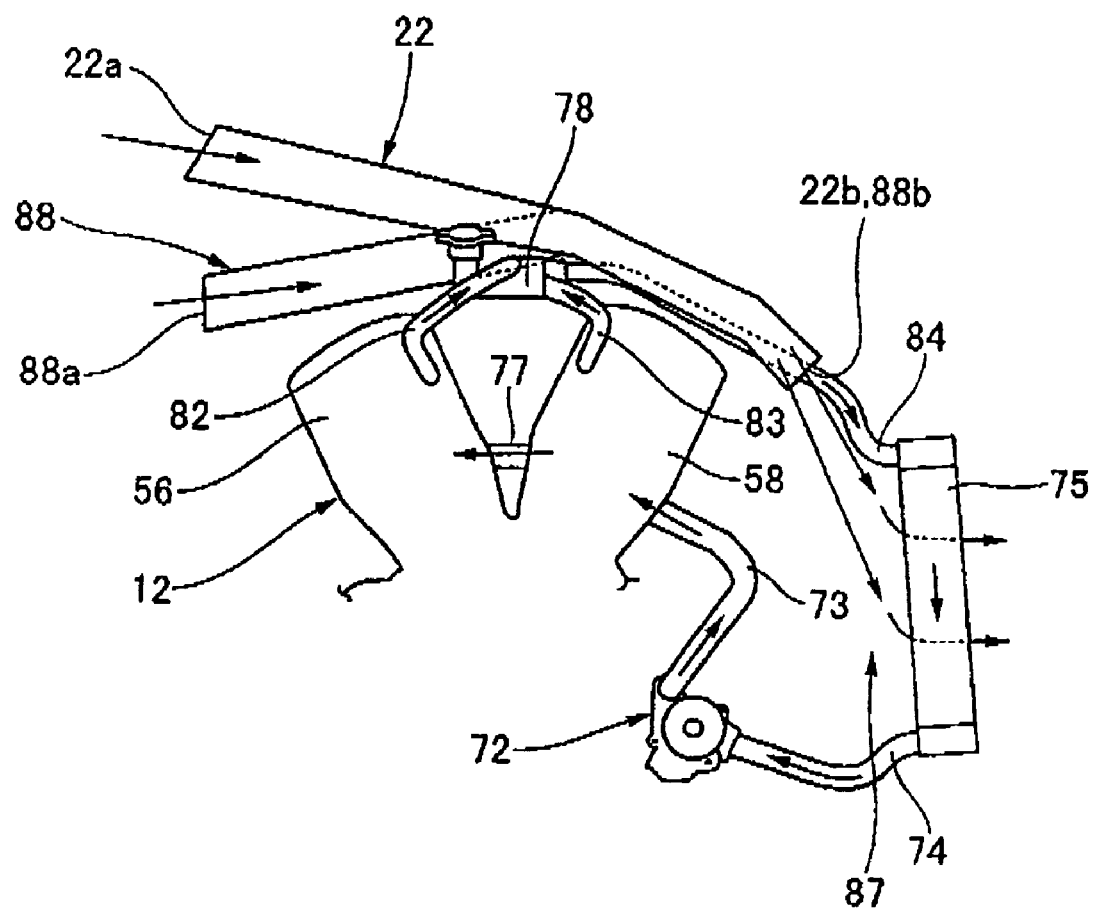
FIG. 19 is a first function diagram which shows the function of the radiator arranging construction according to the third embodiment of the invention.

FIG. 19 is a first function diagram which shows the function of the radiator arranging construction according to the third embodiment of the invention.

When the engine 12 is started, a water pump 72 is activated to generate a flow of coolant which flows therefrom, as indicated by arrows, through a discharge piping 73, a water jacket in a rear cylinder 58, a first coolant piping 77, a water jacket within a front cylinder 56, a second coolant piping 82 to a collecting portion 78 in that order (coolant flows from the rear cylinder 58 via a third coolant piping 83 to the collecting portion 78 in that order), then continues to flow from the collecting portion 78 to the radiator 75 via a fourth coolant piping 84 and, furthermore, returns from the radiator 75 to be absorbed back into the water pump 72 via a suction piping 74.

Then, when the vehicle starts to run, running air can be taken from front end portions 22a of main frames 22 and a front end portion 88a of a center duct 88 into the interiors of the main frames 22 and the center duct 88, as indicated by arrows, and the running air so taken in is then blown out into the space 87 from rear end portions 22b, 88b of the main frames 22 and the center duct 88 so as to be passed through the radiator 75 to cool down the radiator 75.

Figure 20:
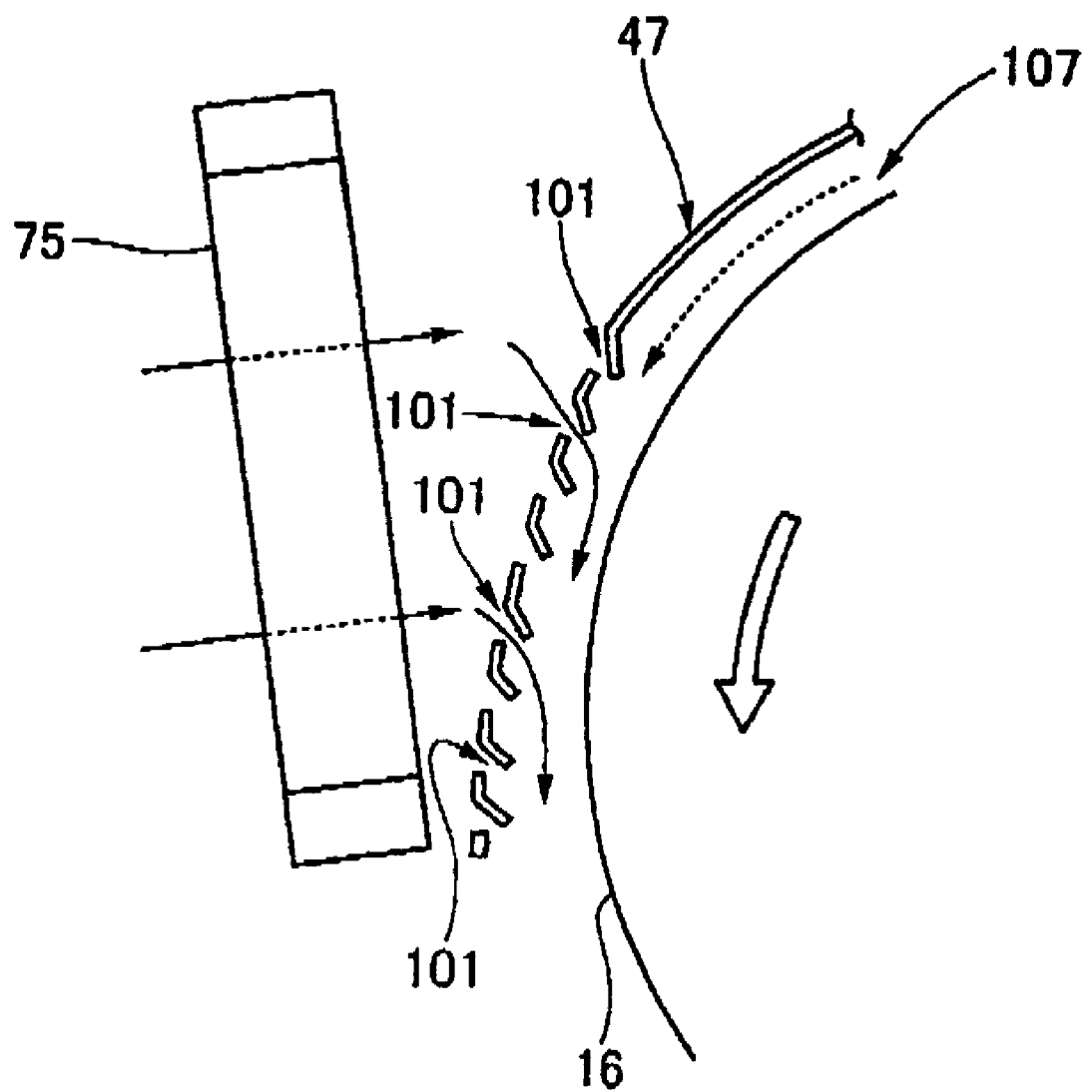
FIG. 20 is a second function diagram which shows the function of the radiator arranging construction according to the third embodiment of the invention.

FIG. 20 is a second function diagram which shows the function of the radiator arranging construction according to the third embodiment of the invention.

Since the rear wheel 16 rotates in a direction indicated by a white thick arrow outlined with a solid line while the vehicle is running, a flow of air is generated as indicated by an arrow of a broken line in a space 107 between an outer circumferential surface of the rear wheel 16 and the rear mudguard 47, and a pressure within the space 107 becomes lower than the ambient pressure.

Consequently, running air that has passed through the radiator 75 is allowed to flow into the space 107 via the plurality of slits 101 in the rear mudguard 47, and the inflow of running air like this is promoted by the space 107 in which the pressure is reduced. As a result, the amount of air that passes through the radiator 75 can be increased to thereby increase the cooling capability by the radiator 75.

As has been described by reference to FIGS. 15 and 18, according to a first aspect of the invention of the third embodiment, in the motorcycle 10 (refer to FIG. 14) having the water-cooled engine 12 installed thereon, the radiator 75 is arranged in the space 87 defined between the engine 12 and the rear wheel 16, and the rear mudguard 47 is arranged between the radiator 75 and the rear wheel 16, whereby the ventilating slits 101 are provided in the rear mudguard 47.

Since the radiator 75 is arranged in the space 87 defined between the engine 12 and the rear wheel 16, the radiator 75 can be made difficult to see from the outside compared with a case where the radiator is arranged at the front of the body frame, and consequently, the radiator 75 is made difficult to be exposed to the outside, and moreover, since the engine 12 is not covered by the radiator 75, the external appearance characteristic of the motorcycle can be improved when the design characteristic of the engine 12 is enhanced.

In addition, mud and water scattered from the rear wheel 16 side towards the radiator 75 are prevented from splashing the radiator 75 by the rear mudguard 47, and moreover, running air that has passed through the radiator 75 passes to the rear wheel 16 side through the slits 101 provided in the rear mudguard 47, whereby even in case the radiator 75 is provided within the interior of the body, the amount of running air that passes through the radiator 75 can be secured, thereby making it possible to secure the cooling performance by the radiator 75.

According to a second aspect of the invention of the third embodiment, as has been described by reference to FIGS. 16 and 20, in the respective configurations, the radiator 75 is preferably made to be supported by the rear wheel swing arm 28.

Since the radiator 75 is supported by the swing arm 28, in the event that the radiator 75 is supported in the vicinity of the pivot shaft 63 which constitutes the center of the swing of the swing arm 28, the swing of the radiator 75 can be made small, thereby making it possible to reduce an extra allowance in length of a piping that is connected to the radiator 75.

In addition, the amount of air that passes to the radiator 75 can be increased by making use at all times of the pressure reduction by virtue of a flow of air generated by the rear wheel 16 which fluctuates together with the swing arm 28, that is, the flow of air within the space 107, thereby making it possible to increase the cooling capability by the radiator 75.

According to a third aspect of the invention of the third embodiment, as has been described by reference to FIGS. 15 and 19, in the respective configurations, the pair of left and right main frames 22 are made to extend rearwards from a headpipe 21 which supports a front fork 27 in a steerable fashion, and interiors of the main frames 22 are formed into ducts, whereby running air is guided from the vicinity of the headpipe 21 into the space 87 through the interiors of the main frames 22.

The amount of running air can be increased which is guided into the space 87 between the engine 12 and the rear wheel 16 by the main frames 22 whose interiors are formed into ducts, thereby making it possible to promote the cooling of coolant by the radiator 75.

Note that while in the embodiment of the invention, as shown in FIG. 16, the radiator is supported by the swing arm in such a manner as to erect with the front surface and the rear surface of the radiator extending in the transverse direction of the vehicle, the invention is not limited thereto, and the radiator may be supported by the swing arm 28 in such a manner as to erect with the front surface and the rear surface extending in the longitudinal direction of the vehicle, and in this case, the radiator may be supported on the swing arm one on each of the left and right sides thereof.

Fourth Embodiment

Figure 21:
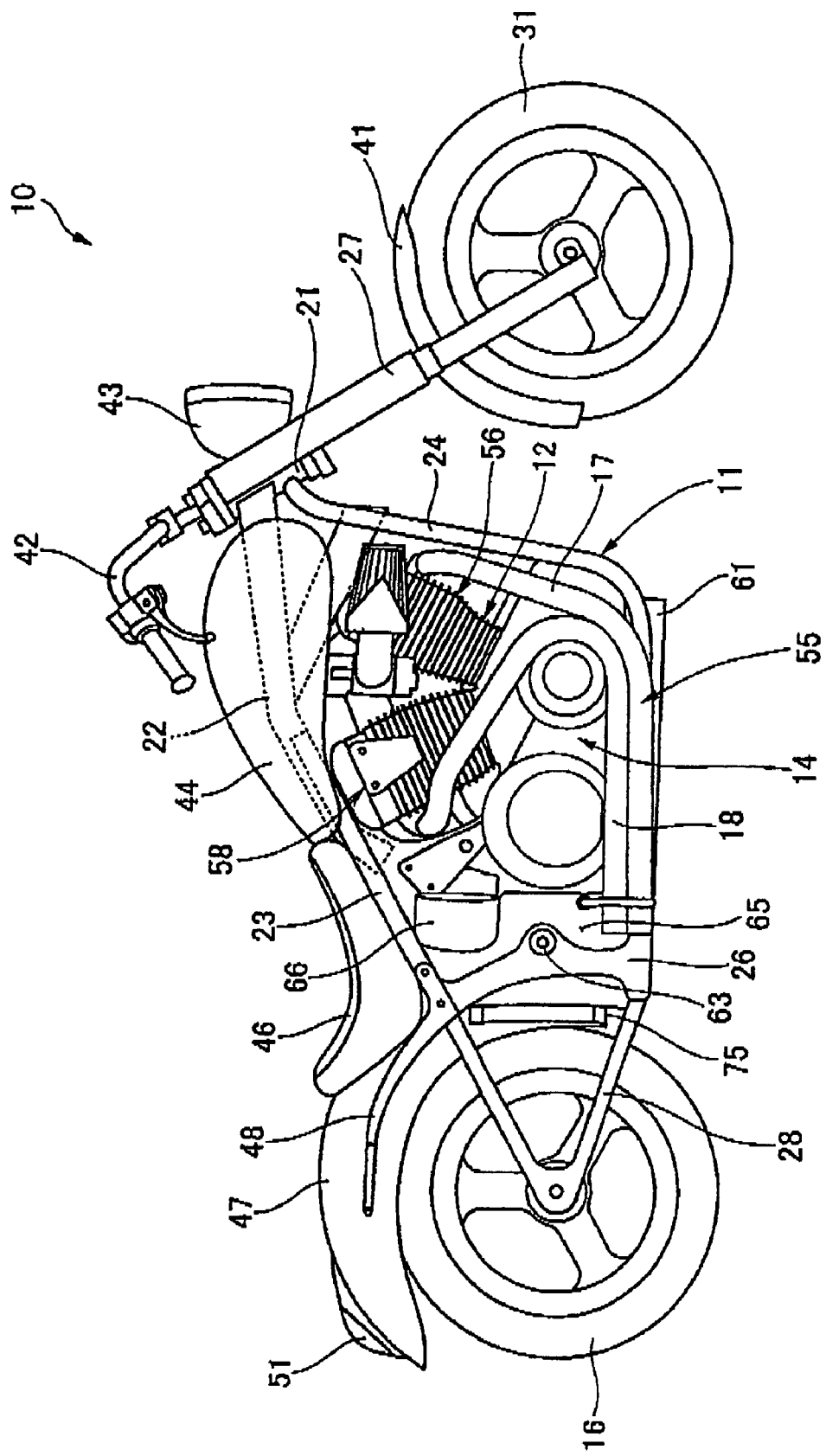
FIG. 21 is a side view of a motorcycle according to a fourth embodiment of the invention.

FIG. 21 is a side view of a motorcycle according to a fourth embodiment of the invention and corresponds to FIG. 2 which shows the first embodiment of the invention. Like reference numerals are imparted to like members to those described in the first embodiment, and only matters will be described in detail herebelow which are different from the first embodiment.

A space shown in the figure as being defined between an engine 12 or, to be specific, a power unit 14 and a rear wheel 16 is a space where a radiator (not shown) is arranged, a space defined between the front of the radiator and the rear of the power unit 14 and between inner sides of pivot plates 26 is covered by covers 65 on both sides thereof, and an intake duct 66 is provided on each of the covers 65.

Figure 22:
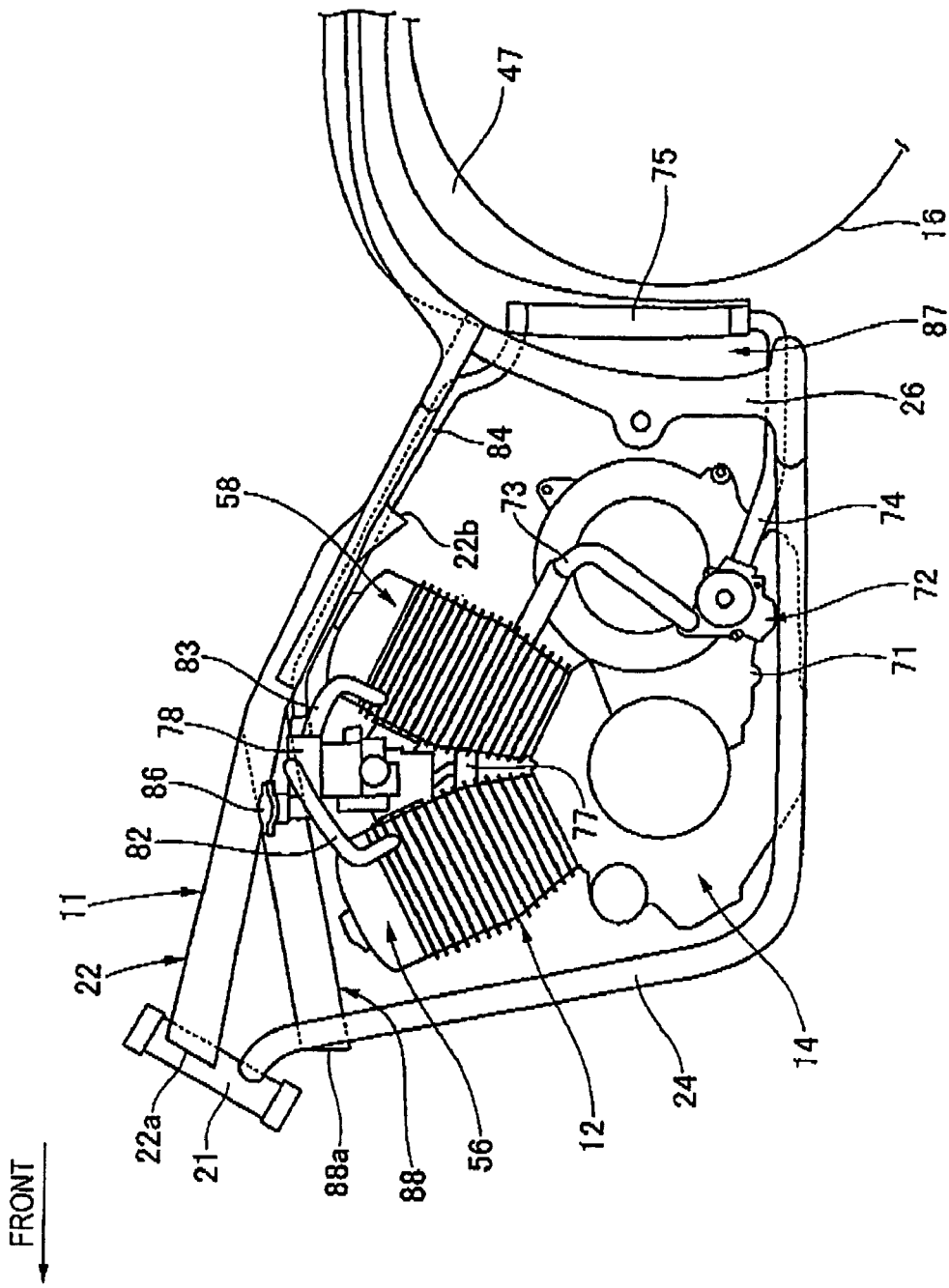
FIG. 22 is a side view of a main part of the motorcycle according to the fourth embodiment of the invention.

FIG. 22 is a side view of a main part of the motorcycle according to the embodiment of the invention (in the figure, an arrow (FRONT) denotes the front of the vehicle) and shows mainly a left side of a body frame 11 and the power unit. The figure also shows that a radiator 275 is mounted at a front and lower portion of a rear mudguard 47. Namely, the radiator 275 is shown as being arranged in the space 87 defined between the engine 12 and the rear wheel 16 or, to be specific, between the power unit 14 and the rear wheel 16.

Figure 23:
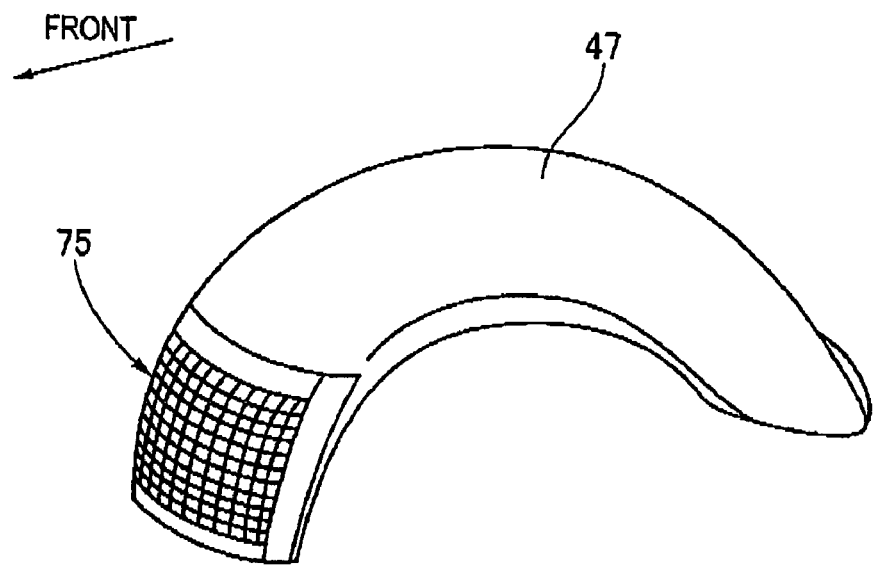
FIG. 23 is a perspective view which shows a radiator and a rear mudguard according to the fourth embodiment of the invention.

FIG. 23 is a perspective view of the radiator and the rear mudguard 47 according to the embodiment of the invention and shows that the radiator 275 is mounted integrally on the front of the rear mudguard 47 and in such a manner as to follow a curved surface of the rear mudguard 47. Thus, the sense of integration of the radiator 275 and the rear mudguard 47 is strengthened, and hence, for example, the radiator 275 can be made less conspicuous when viewed from the side thereof.

Figure 24:
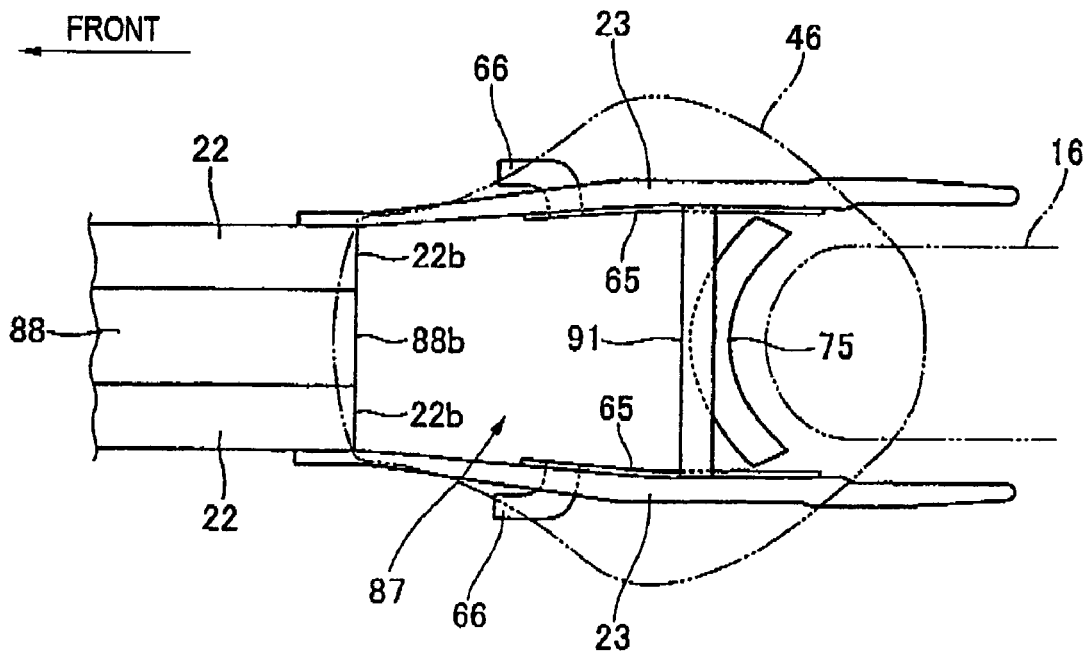
FIG. 24 is a plan view of a main part of the motorcycle according to the fourth embodiment of the invention.

FIG. 24 is a plan view of the main part of the motorcycle according to the embodiment of the invention and shows that a center duct 88 is mounted between left and right main frames 22, 22, rear end portions 22b, 22b, 88b of the main frames 22, 22 and the center duct 88 are aligned, seat rails 23, 23 that are attached, respectively, to the left and right main frames 22, 22 are mounted, the radiator 275 is arranged between the seat rails 23, 23 as viewed from the top, and the intake duct 66 is mounted on each of the side covers 65, 65 which are situated inside the seat rails 23, 23, respectively, as viewed from the top. The space 87 is defined inside the left and right side covers 65, 65. Note that reference numeral 91 denotes a crossmember that is extended between the left and right seat rails 23, 23, and 46 a seat.

The function of the radiator arranging construction that has been described heretofore will next be described.

Figure 25:
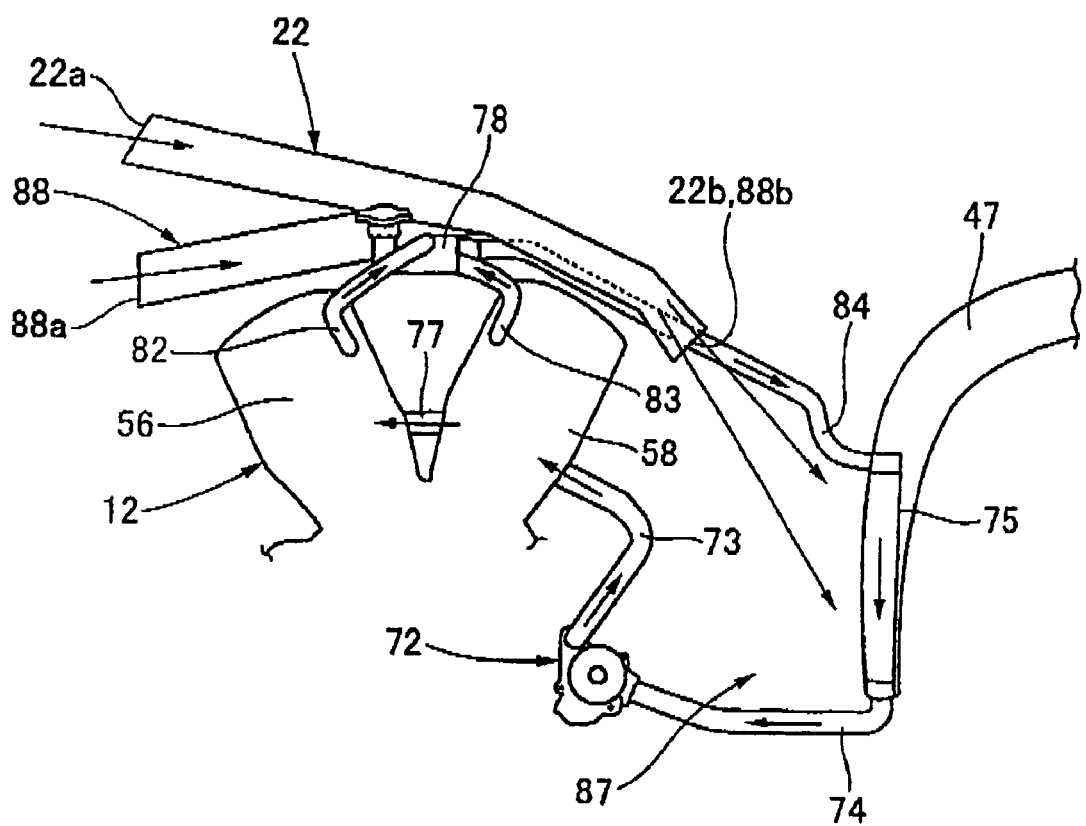
FIG. 25 is a first function diagram which shows the function of a radiator arranging construction according to the fourth embodiment of the invention.

FIG. 25 is a first function diagram which shows the function of the radiator arranging construction according to the fourth embodiment of the invention.

When the engine 12 is started, a water pump 72 is activated to generate a flow of coolant which flows therefrom, as indicated by arrows, through a discharge piping 73, a water jacket in a rear cylinder 58, a first coolant piping 77, a water jacket within a front cylinder 56, a second coolant piping 82 to a collecting portion 78 in that order (coolant flows from the rear cylinder 58 via a third coolant piping 83 to the collecting portion 78 in that order), then continues to flow from the collecting portion 78 to the radiator 275 via a fourth coolant piping 84 and, furthermore, returns from the radiator 275 to be absorbed back into the water pump 72 via a suction piping 74.

Then, when the vehicle starts to run, running air can be taken from front end portions 22a of the main frames 22 and a front end portion 88a of the center duct 88 into the interiors of the main frames 22 and the center duct 88, as indicated by arrows, and the running air so taken in is then blown out into the space 87 from the rear end portions 22b, 88b of the main frames 22 and the center duct 88 so as to be passed through the radiator 275 to cool down the radiator 275.

Figure 26:
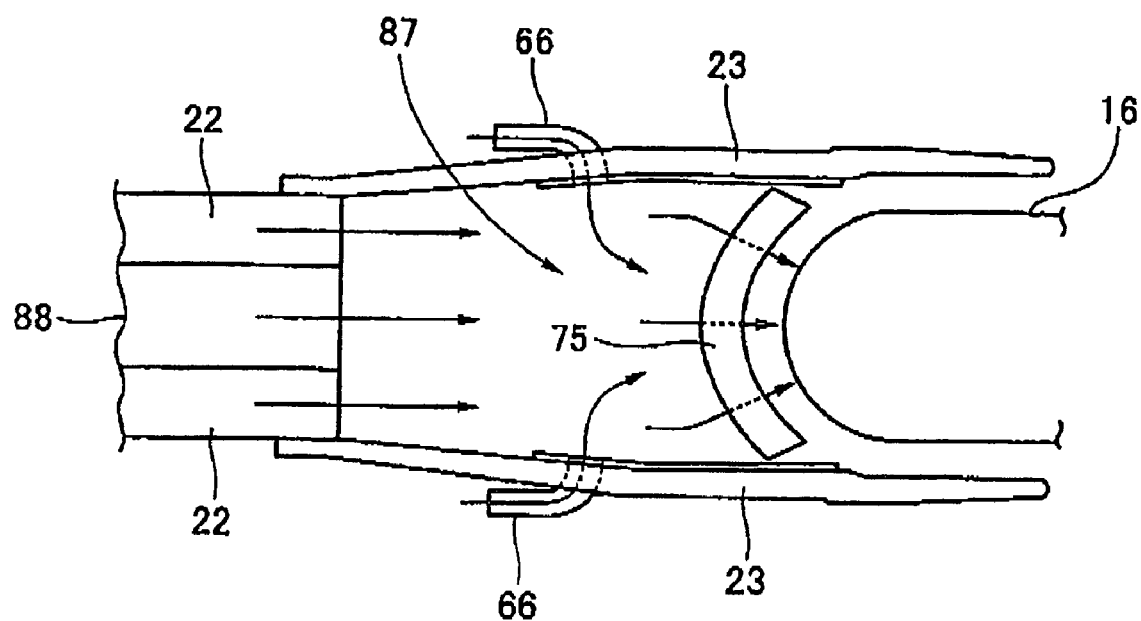
FIG. 26 is a second function diagram which shows the function of the radiator arranging construction according to the fourth embodiment of the invention.

FIG. 26 is a second function diagram which shows the function of the radiator arranging construction according to the fourth embodiment of the invention.

The running air that is so taken in flows, as shown by arrows, from the interiors of the main frames 22, 22 and the center duct 88 into the space 87 and other running air flows into the space from the sides of the vehicle through the left and right intake ducts 66, 66 so as to be passed through the radiator to thereby cool down the radiator 275.

Figure 27:
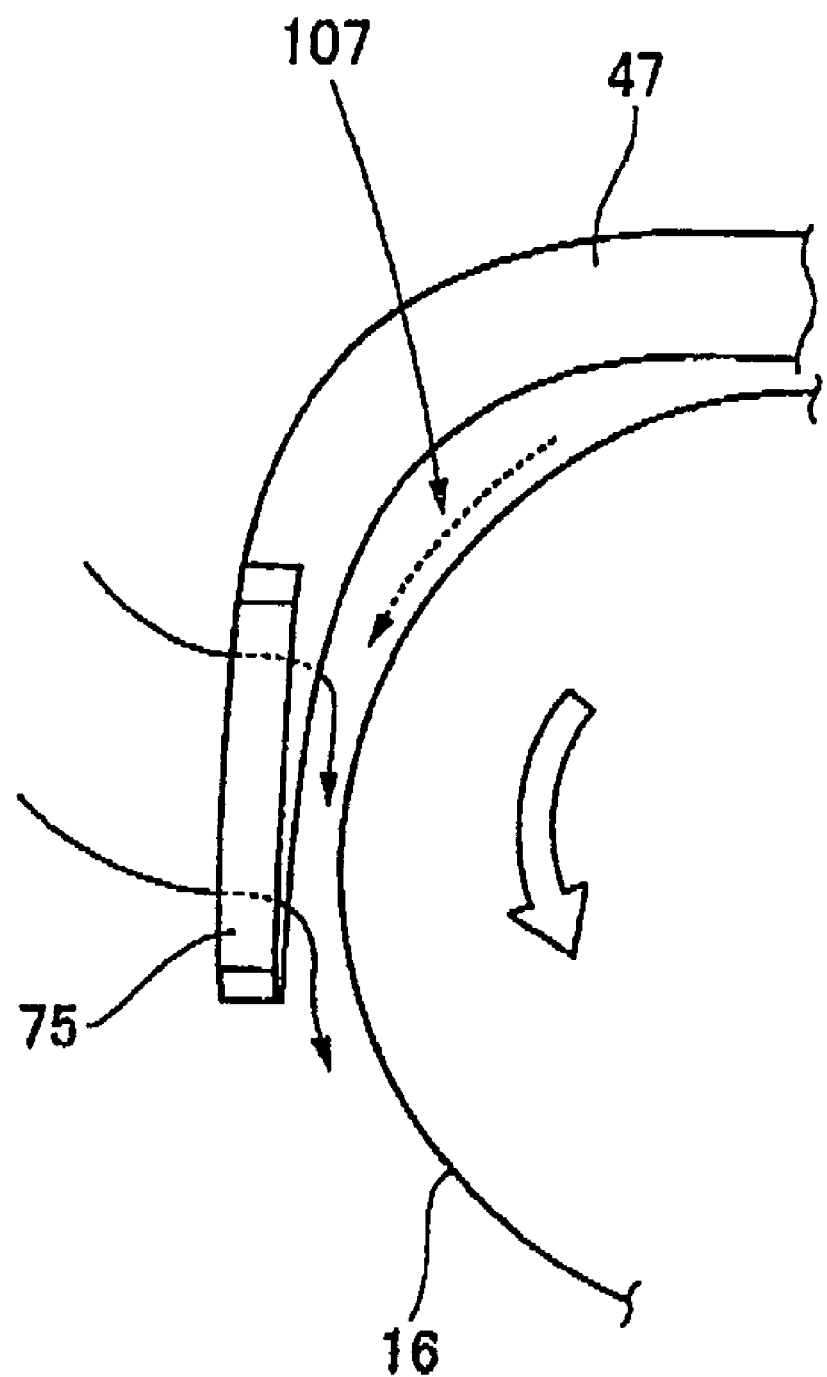
FIG. 27 is a third function diagram which shows the function of the radiator arranging construction according to the fourth embodiment of the invention.

FIG. 27 is a third function diagram which shows the function of the radiator arranging construction according to the embodiment of the invention.

Since the rear wheel 16 rotates in a direction indicated by a thick white arrow outlined with a solid line, a flow of air is being generated as indicated by an arrow of a broken line within a space 107 defined between an outer circumferential surface of the rear wheel 16 and the rear mudguard 47, and hence, due to this, the pressure within the space 107 becomes lower than the ambient pressure.

Consequently, the inflow of running air that has passed through the radiator 275 into the space 107 is promoted by the space 107 in which the pressure is reduced, and as a result, the amount of air that passes through the radiator 275 is increased, thereby making it possible to increase the cooling capability by the radiator 275.

As has been described by reference to FIGS. 22 to 24, according to a first aspect of the invention of the fourth embodiment, in the motorcycle 10 (refer to FIG. 21) having the water-cooled engine 12 installed thereon, the radiator 275 is mounted on the front the rear mudguard 47 which covers the front and top of the rear wheel 16.

Since the radiator 275 is mounted on the front of the rear mudguard 47, the radiator 275 can be made less conspicuous from the outside compared with a case where the radiator is arranged at the front of the body frame. Consequently, the radiator 275 is made difficult to be exposed to the outside, and moreover, since the radiator 275 is not covered by the engine 12, the design characteristic of the engine 12 can sufficiently be exhibited when the design characteristic of the engine 12 is enhanced, whereby the external appearance characteristic of the motorcycle 10 can be improved.

According to a second aspect of the invention of the fourth embodiment, the radiator 275 is formed into the shape which follows the curved surface of the rear mudguard 47.

Since the radiator 275 is formed into the shape which follows the curved surface of the rear mudguard 47, the radiator 275 can be made less conspicuous when viewed from the side thereof, whereby the external appearance characteristic of the motorcycle 10 can be improved further.

According to a third aspect of the invention of the fourth embodiment, the intake ducts 66 are provided which taken in running air to be guided into the space 87 which is further forward than the rear mudguard 47 and further rearward than the engine 12.

Since the intake ducts 66 are provided which take in running air to be guided into the space 87 between the rear mudguard 47 and the engine 12, a larger amount of running air can be guided into the space 87 between the engine 12 and the radiator 275 by the intake ducts 66 so provided, whereby the cooling of coolant by the radiator 275 can be promoted further.

Note that while in this embodiment, the single radiator 275 is provided on the front portion of the rear mudguard 47 as shown in FIG. 24, the invention is not limited thereto, and the radiator 275 may be provided one on each of left and right sides of the front portion of the rear mudguard 47 (for example, each radiator 275 is arranged in such a manner as to extend substantially in the longitudinal direction of the vehicle).

Fifth Embodiment

Figure 28:
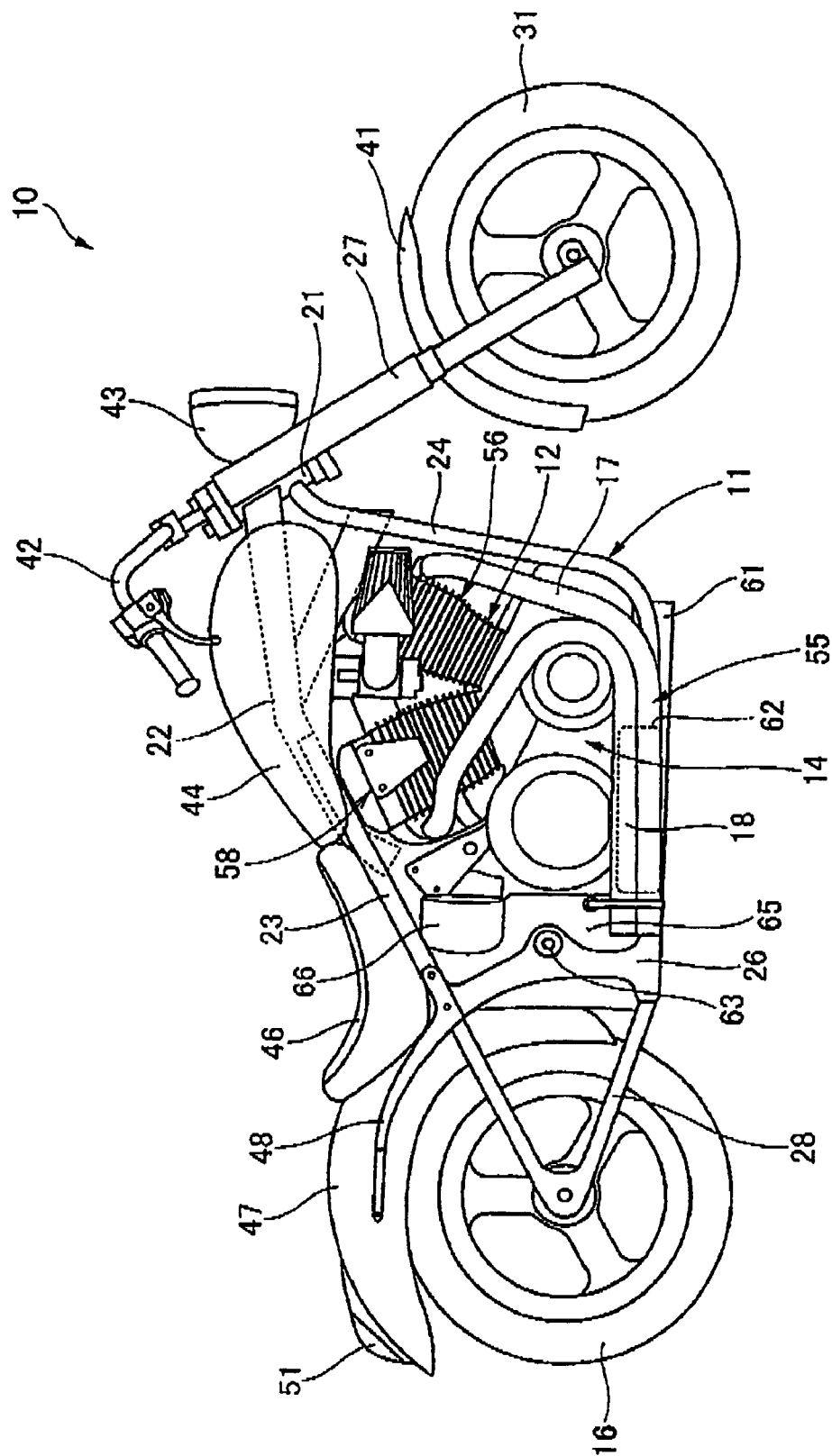
FIG. 28 is a side view of a motorcycle according to a fifth embodiment of the invention.

FIG. 28 is a side view of a motorcycle according to a fifth embodiment of the invention and corresponds to FIG. 2 which shows the first embodiment of the invention. Like reference numerals are imparted to like members to those described in the first embodiment, and only matters will be described in detail hereinbelow which are different from the first embodiment.

In this embodiment, a muffler 62 arranged on a body frame below a power unit 14 is provided for connection to a first exhaust pipe 17 and a second exhaust pipe 18.

Figure 29:
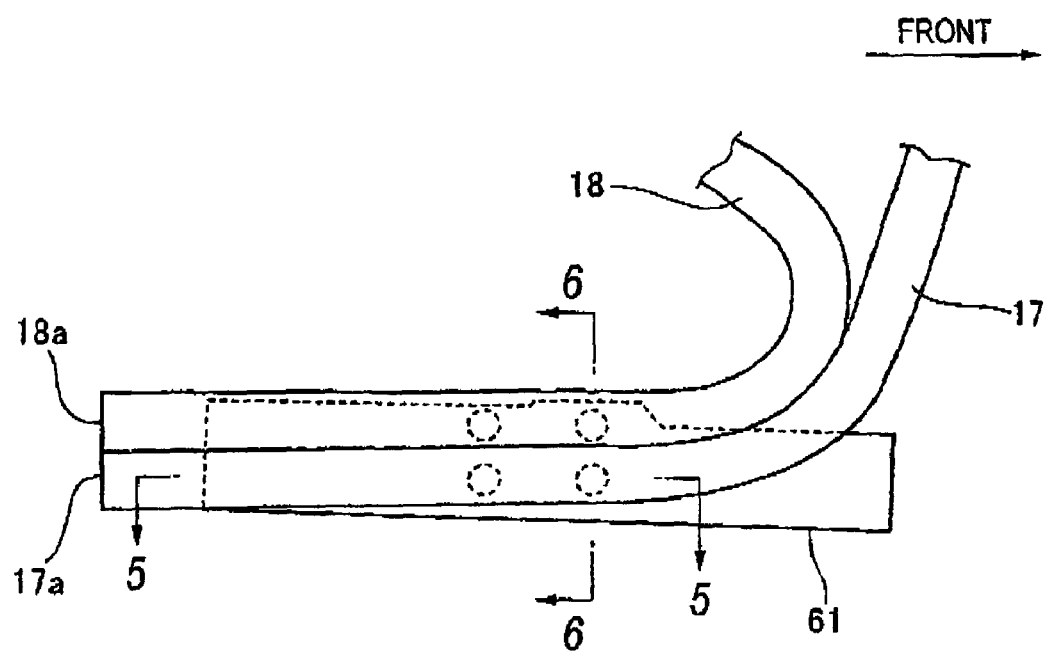
FIG. 29 is a side view of an undercover and exhaust pipes according to the fifth embodiment of the invention.

FIG. 29 is a side view of an undercover and the exhaust pipes according to the fifth embodiment of the invention (in the figure, an arrow (FRONT) denotes the front of the vehicle. This is true hereinafter.) and shows that an undercover 61 is arranged transversely inward of the first exhaust pipe 17 and the second exhaust pipe 18. Note that reference numerals 17a, 18a denote rear end openings of the first exhaust pipe 17 and the second exhaust pipe 18, respectively.

Figure 30:
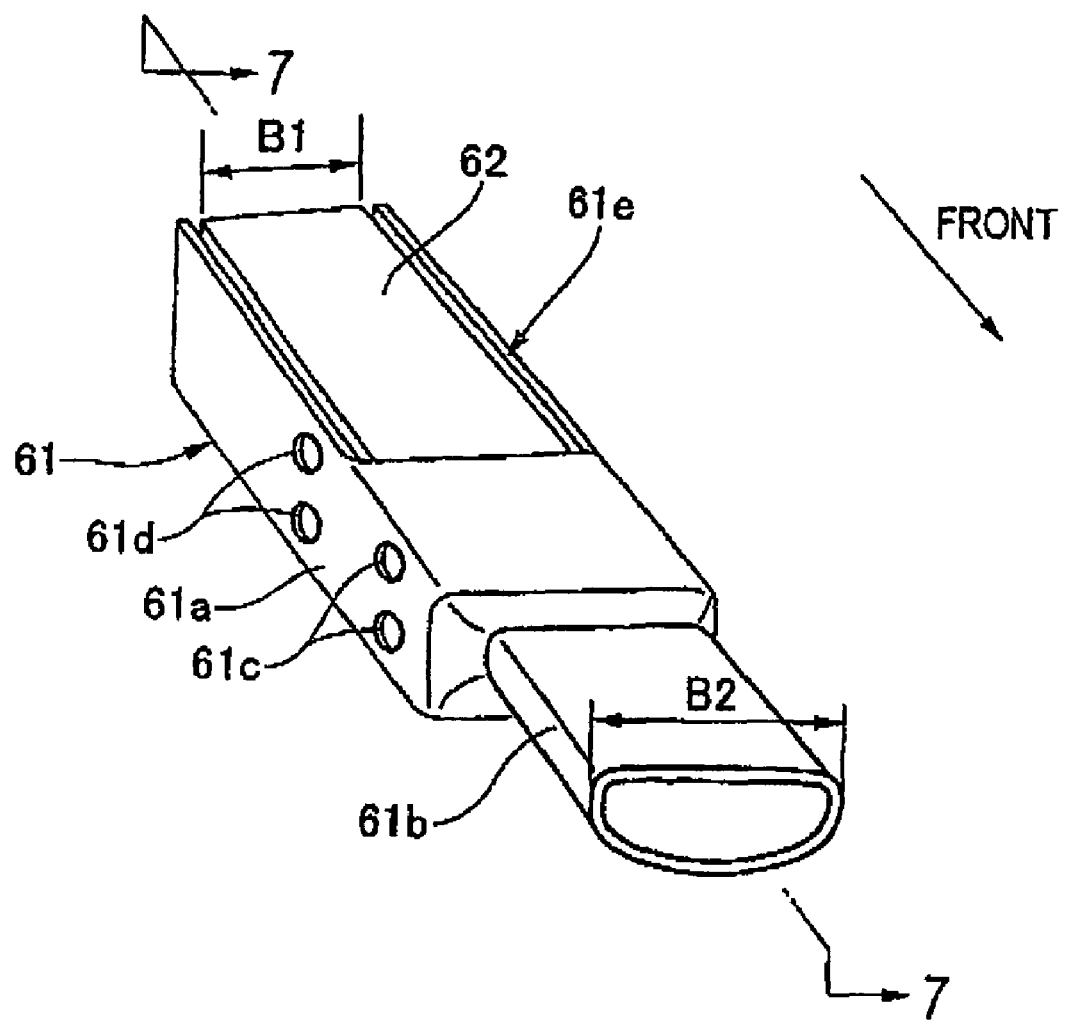
FIG. 30 is a perspective view of the undercover and a muffler according to the fifth embodiment of the invention.

FIG. 30 is a perspective view which shows the undercover and the muffler according to the fifth embodiment of the invention, and the undercover 61 is made up of a main body portion 61a which covers the periphery of the muffler 62 and a duct-shaped portion 61b which is made to project forward from the main body portion 61a. Note that reference numerals 61c, 61c, 61d, 61d denote pipe passing holes which pass through a communication pipe which establishes a communication between the first exhaust pipe 17 and the second exhaust pipe 18 (refer to FIG. 29) and the muffler 62, 61e a rear opening that is formed to open a rear upper portion of the main body portion 61a, B1 a transverse width of the muffler 62 and B3 a transverse width of the duct-shaped portion 61b of the undercover 61.

Figure 31:
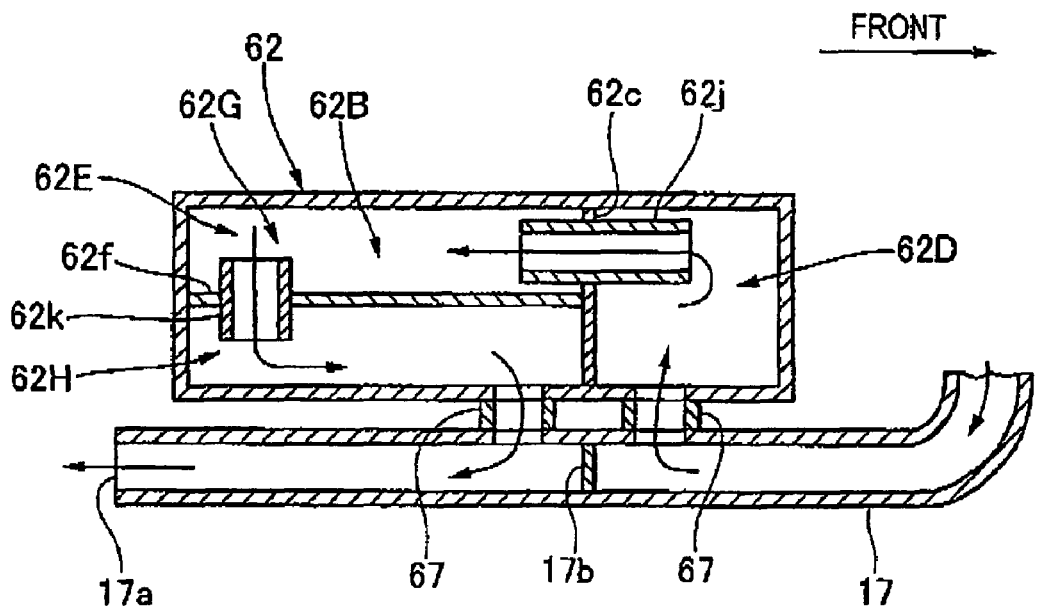
FIG. 31 is a sectional view taken along the line 5-5 in FIG. 29.

FIG. 31 is a sectional view taken along the line 5-5 in FIG. 29, in which the undercover 61 (refer to FIG. 30) is omitted.

The muffler 62 is configured as will be described below. The muffler 62 is divided by a bulkhead into an upper compartment 62A (not shown) and a lower compartment 62B, the lower compartment 62B is divided by a bulkhead 62c into a first compartment 62D and a second compartment 62E, and furthermore, the second compartment 62E is divided by a bulkhead 62f into a left compartment 62G and a right compartment 62H. Furthermore, the first compartment 62D is made to communicate with the left compartment 62G by providing a communication pipe 62j in the bulkhead 62c, and the left compartment 62G is made to communicate with the right compartment 62H by providing a communication pipe 62k in the bulkhead 62f. The first compartment 62D and the right compartment 62H communicate with the first exhaust pipe 17, respectively, via communication pipes 67. Note that reference numeral 17b denotes a bulkhead which separates the first exhaust pipe 17 longitudinally, and the second exhaust pipe 18 also has a similar bulkhead which separates the second exhaust pipe 18 longitudinally. The upper compartment 62A has the same construction as that of the lower compartment 62B.

Exhaust gas in the first exhaust pipe 17 enters the first compartment 62D via the communication pipe 67 as indicated by an arrow, flows from the first compartment 62D into the left compartment 62G through the communication pipe 62j, then from the left compartment 62G into the right compartment 62H through the communication pipe 62k, returns from the right compartment 62H to the first exhaust pipe 17 via the communication pipe 67, and is discharged to the outside from a rear end opening 17a of the first exhaust pipe 17.

Figure 32:
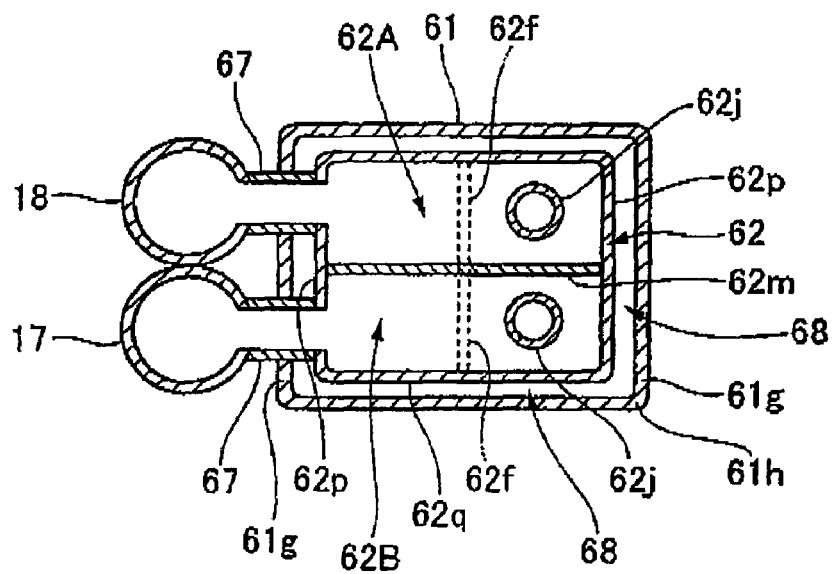
FIG. 32 is a sectional view taken along the line 6-6 in FIG. 29.

FIG. 32 is a sectional view taken along the line 6-6 in FIG. 29 and shows that the first exhaust pipe 17 and the second exhaust pipe 18 are made to communicate with the muffler 62 via communication pipes 67, 67 at intermediate positions thereof and the interior of the muffler 62 is divided by a bulkhead 62m into an upper compartment 62A and a lower compartment 62B. The muffler 62 that is configured as has just been described is referred to as an expansion type, and the frequency and attenuation volume of noise to be attenuated are determined by capacities of the respective compartments 62D, 62G, 62H (refer to FIG. 31) and the inside diameters and lengths of the respective communication pipes 67, 62j, 62k (refer to FIG. 31).

In the muffler 62 that has been described above, the bulkhead 62m may not be provided to make the upper compartment 62A and the lower compartment 62B integral with each other.

Note that reference numerals 62g, 62g denote side walls of the undercover 61, 62p, 62p sides of the muffler 62, and 62q a bottom side of the muffler 62, and 62q a bottom of the muffler 62.

Figure 33:
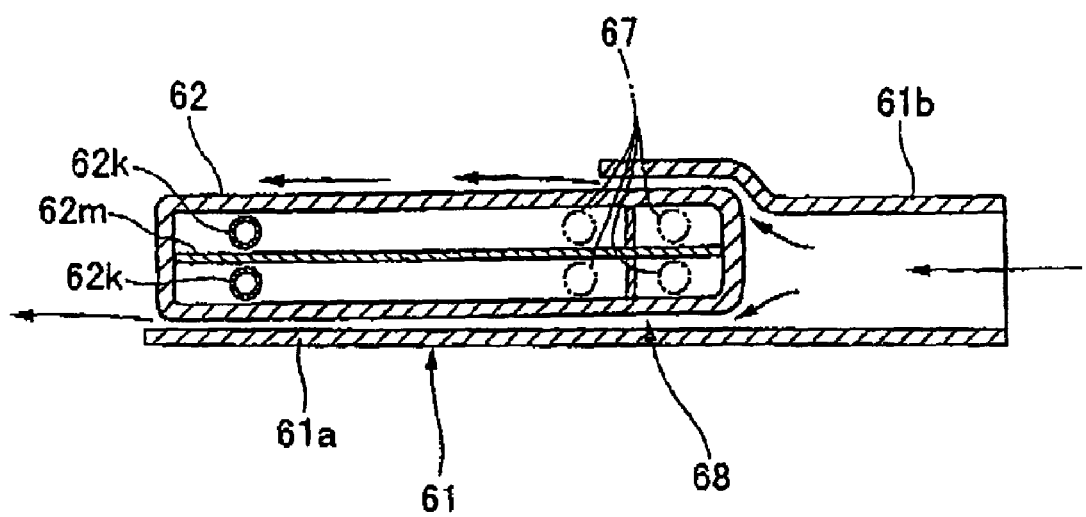
FIG. 33 is a sectional view taken along the line 7-7 in FIG. 29.

FIG. 33 is a sectional view taken along the line 7-7 in FIG. 30 and shows that a gap 68 is provided between the muffler 62 and the undercover 61 which permits the passage of air therethrough, so that running air that is taken into the interior of the duct-shaped portion 61b from the front of the vehicle as indicated by an arrow while the vehicle is running is made to flow to the rear of the vehicle through the gap 68.

By this configuration, the dissipation of heat generated in the heated muffler 62 can be promoted, thereby making it possible to cool down the muffler 62.

The function of the radiator arranging construction that has just been described will next be described.

As has been described by reference to FIGS. 28 and 30, according to a first aspect of the invention of the fifth embodiment, in the muffler arranging construction of the motorcycle 10 in which the first exhaust pipe 17 and the second exhaust pipe 18, which function as exhaust pipes, are made to extend along the side of the body, and the first exhaust pipe 17 and the second exhaust pipe 18 are made to open to the rear, the muffler 62 is arranged below the body or, to be specific, below the power unit 14, and the undercover 61 is arranged in front of the muffler 62 as the duct-shaped cover.

Since the muffler 62 is arranged below the body and the undercover 61, which functions as the duct-shaped cover, is arranged in front of the muffler 62, the muffler below the body can be made less conspicuous, thereby making it possible to improve the external appearance characteristic of the motorcycle 10 (refer to FIG. 28). Furthermore, the appearance of a lower portion of the body can be improved by the duct-shaped undercover 61 that is situated in front of the muffler 62.

According to a second aspect of the invention of the fifth embodiment, in the configuration described above, the end portion openings 17a, 18a as openings of the first exhaust pipe 17 and the second exhaust pipe 18 are preferably provided in the vicinity of a pivot shaft 63 of a swing arm 28.

Since the end portion openings 17a, 18a (refer to FIG. 29) of the first exhaust pipe 17 and the second exhaust pipe 18 are provided in the vicinity of the pivot shaft 63 of the swing arm 28, there is no risk that the side of the rear wheel is covered by, for example, the exhaust pipes and the muffler, whereby the external appearance characteristic of the motorcycle 10 can be improved. Thus, the noise muffling effect is not damaged while making the first exhaust pipe 17 and the second exhaust pipe 18 look short.

As has been described by reference to FIG. 33, according to a third aspect of the invention of the fifth embodiment, in the above configuration, air is preferably guided to the periphery of the muffler 62 by the undercover 61.

Since air is guided to the periphery of the muffler 62 by means of the undercover 61, the dissipation of heat generated in the muffler 62 can be promoted, thereby making it possible to enhance the effect of cooling the muffler 62.

As has been described by reference to FIG. 33, according to a fourth aspect of the invention of the fifth embodiment, in the above configuration, the radiator 75 is preferably arranged between the engine 12 and the rear wheel 16.

Since the radiator 75 is arranged between the engine 12 and the rear wheel 16, the radiator 75 can be made less conspicuous compared with a case where the radiator 75 is arranged at the front of the body frame. Consequently, the radiator 75 is made difficult to be exposed to the outside. Moreover, since the radiator 75 is not covered by the radiator 12, the external appearance characteristic of the motorcycle (refer to FIG. 28) can be improved when the design characteristic of the engine 12 is enhanced.

As is shown in FIGS. 30, 32 and 33, according to a fifth aspect of the invention of the fifth embodiment, in the above configuration, the transverse width B1 of the muffler 62 and the transverse width B2 of the undercover 61 (to be specific, the duct-shaped portion 61b) are preferably made to be substantially equal to each other.

Since the transverse width B1 of the muffler 62 and the transverse width of the undercover 61 are made to be substantially equal to each other, there can be provided an impression that the muffler 62 and the undercover 61 are integral, thereby making it possible to improve the appearance of the lower portion of the body.

According to a sixth aspect of the invention of the fifth embodiment, the left and right side walls 61g, 61g which function as the left and right walls of the undercover 61 and the bottom wall 61h are made to extend so as to follow the left and right sides 62p, 62p and the bottom side 62q of the muffler 62.

Since the left and right side walls 61g, 61g and the bottom wall 61h are made to extend so as to follow the left and right sides 62p, 62p and the bottom side 62q of the muffler 62, the uniform gap 68 can be formed between the muffler 62 and the undercover 61, whereby the dissipation of heat generated in the muffler 62 can be promoted by guiding running air to the gap 68.

Note that while in the embodiment shown in FIG. 30, while the undercover 61 is made up of the main body portion 61a and the duct-shaped portion 61b, the invention is not limited thereto, and the undercover 61 may be made up only of the duct-shaped portion 61b.

Sixth Embodiment

Figure 34:
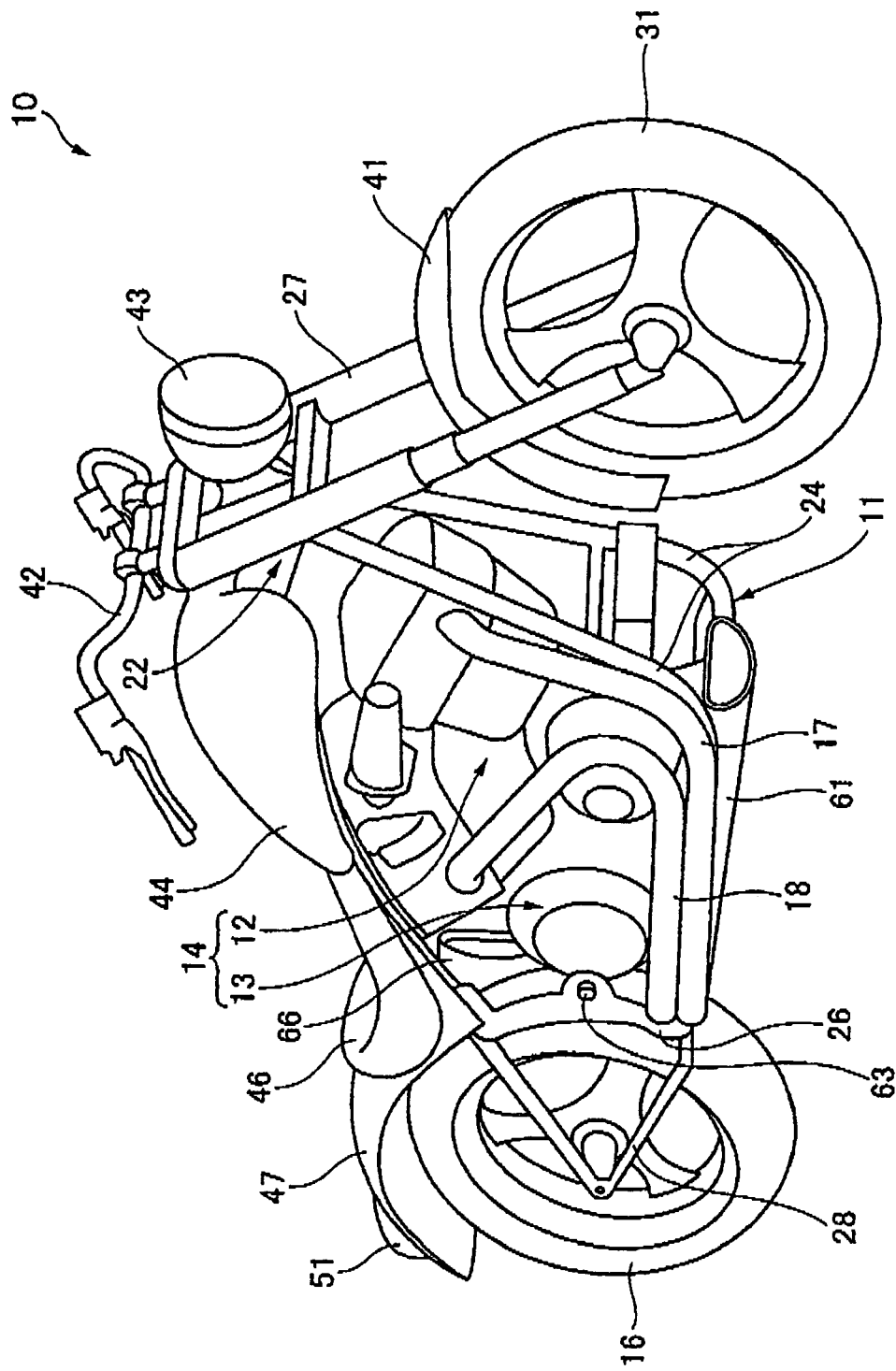
FIG. 34 is a perspective view of a motorcycle which adopts the radiator arranging construction according to the invention.

FIG. 34 is a perspective view which shows a motorcycle which adopts a radiator arranging construction according to a sixth embodiment of the invention and corresponds to FIG. 1 which shows the first embodiment. Like reference numerals are imparted to like members to those described in the first embodiment, and only matters will be described in detail below which are different from the first embodiment.

Note that no center duct 88 between left and right mainframes 22, 22 is required in this embodiment.

Figure 35:
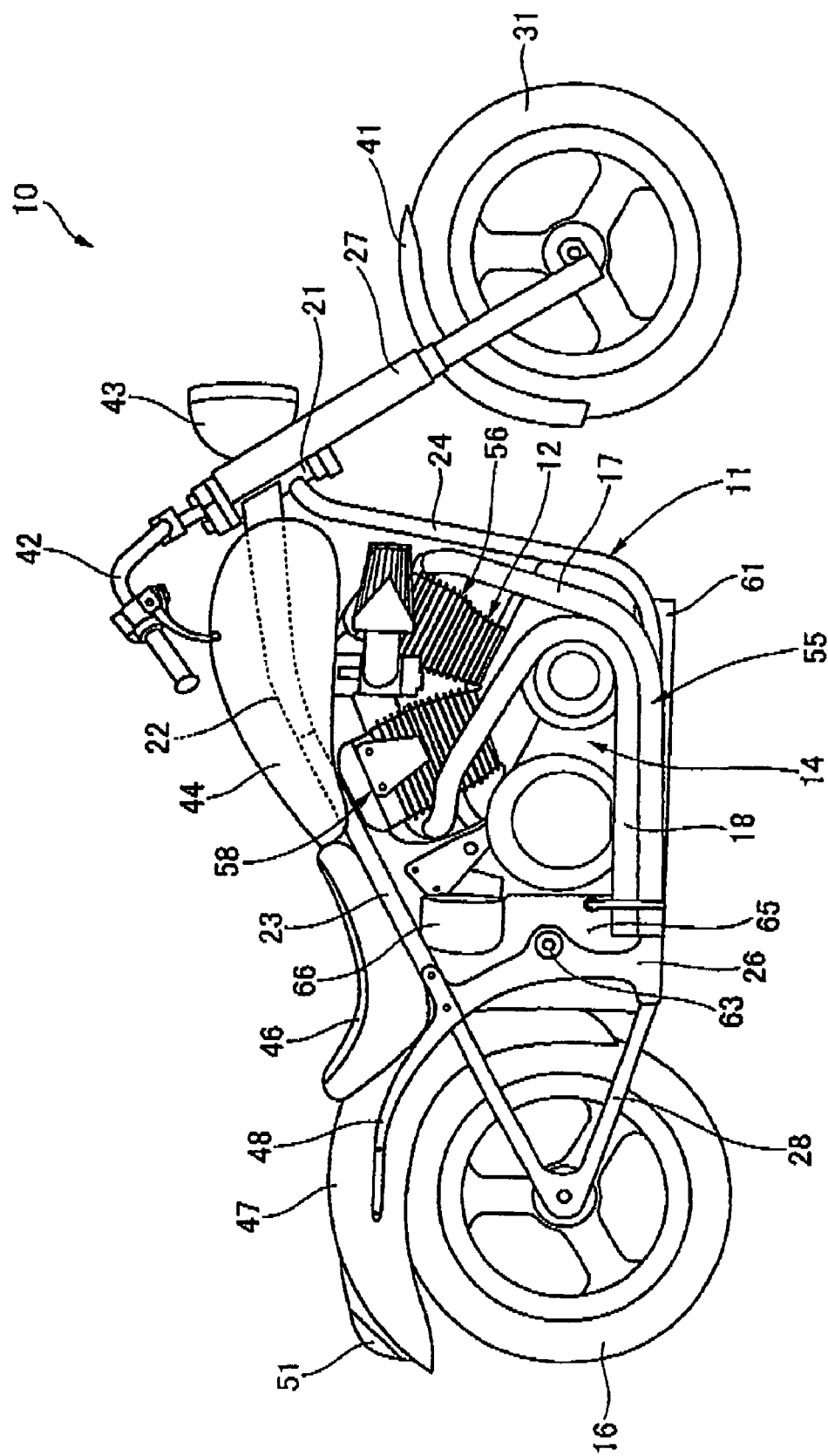
FIG. 35 is a side view of the motorcycle according to the invention.

FIG. 35 is a side view of a motorcycle according to the sixth embodiment of the invention and corresponds to FIG. 2 which shows the first embodiment.

Figure 36:
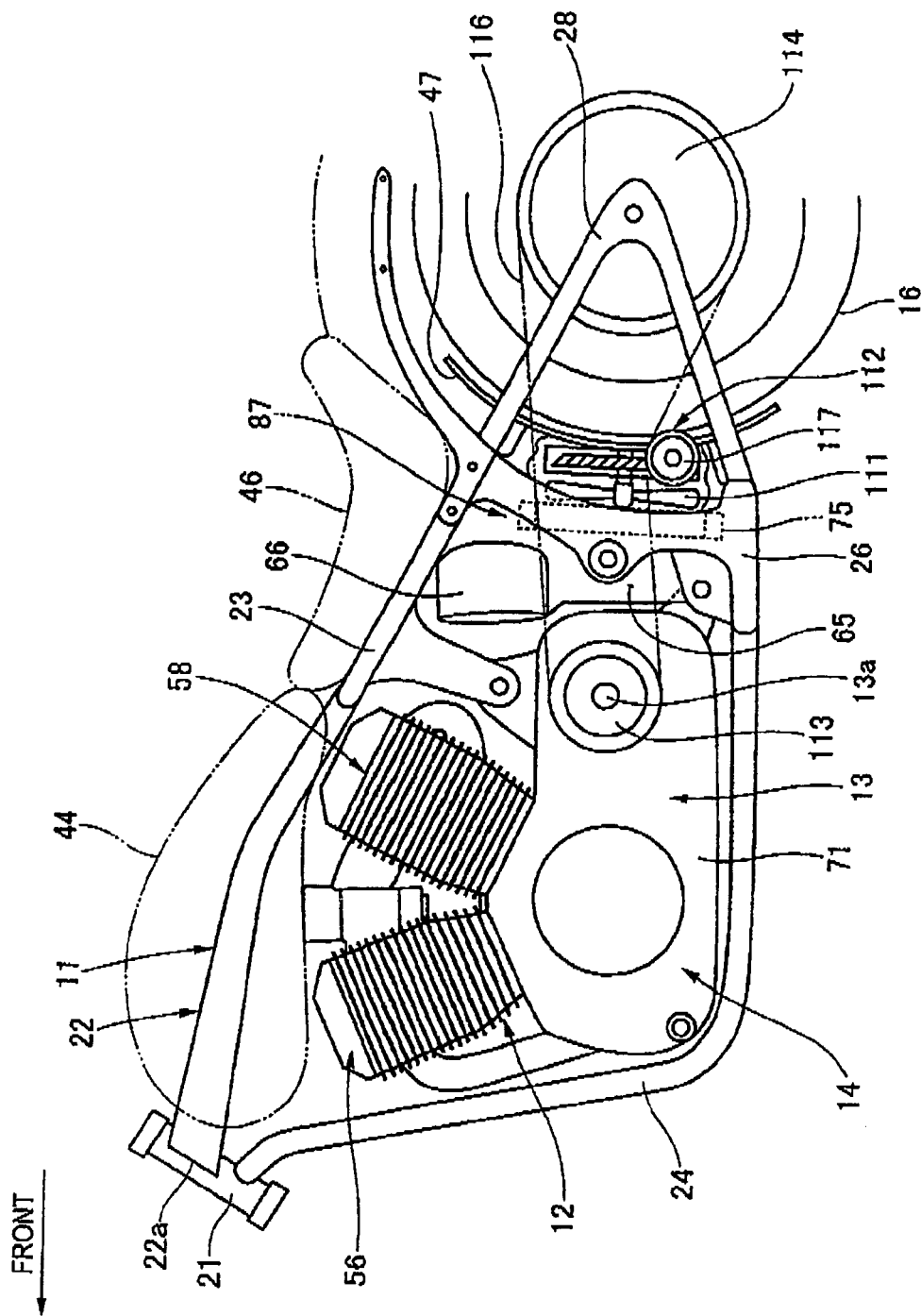
FIG. 36 is a side view of a main part of the motorcycle according to the invention.

FIG. 36 is a side view of a main part of the motorcycle according to the sixth embodiment of the invention and shows mainly a left side of a body frame 11 and a power unit 14. Note that an arrow (FRONT) in the figure denotes the front of the vehicle. In addition, a cooling fan 11 and a fan driving unit 112 which are disposed inside side covers 65 are shown by partially breaking the side cover 65.

The power unit 14 includes a water pump, not shown, on a side of a crankcase 71, and coolant within a water jacket of an engine 12 is circulated to a radiator 75 by means of the water pump so as for the coolant to be cooled therein.

In the figure, reference numeral 111 denotes a cooling fan that is arranged at the back of the radiator 75 in such a manner as to be close thereto to cool the radiator 75, 112 the fan driving unit for driving the cooling fan 111.

The radiator 75 is a flat rectangular component that is mounted on the left and right pivot plates 26 so as to be arranged between the left and right pivot plates 26 and is arranged in such a manner that a front surface and a rear surface thereof extend in the transverse direction of the vehicle while being inclined in such a manner that an upper portion is situated further longitudinally rearwards than a lower portion thereof.

Namely, the radiator 75 is such as to be arranged in a space 87 defined between the engine 12 and a rear wheel 16 or, to be specific, between the power unit 14 and the rear wheel 16.

The radiator 75 may be made to be mounted on a swing arm 28, and as this occurs, a shroud which covers the periphery of the radiator 75 and a rear mudguard 47 may be formed integral with each other.

Figure 37:
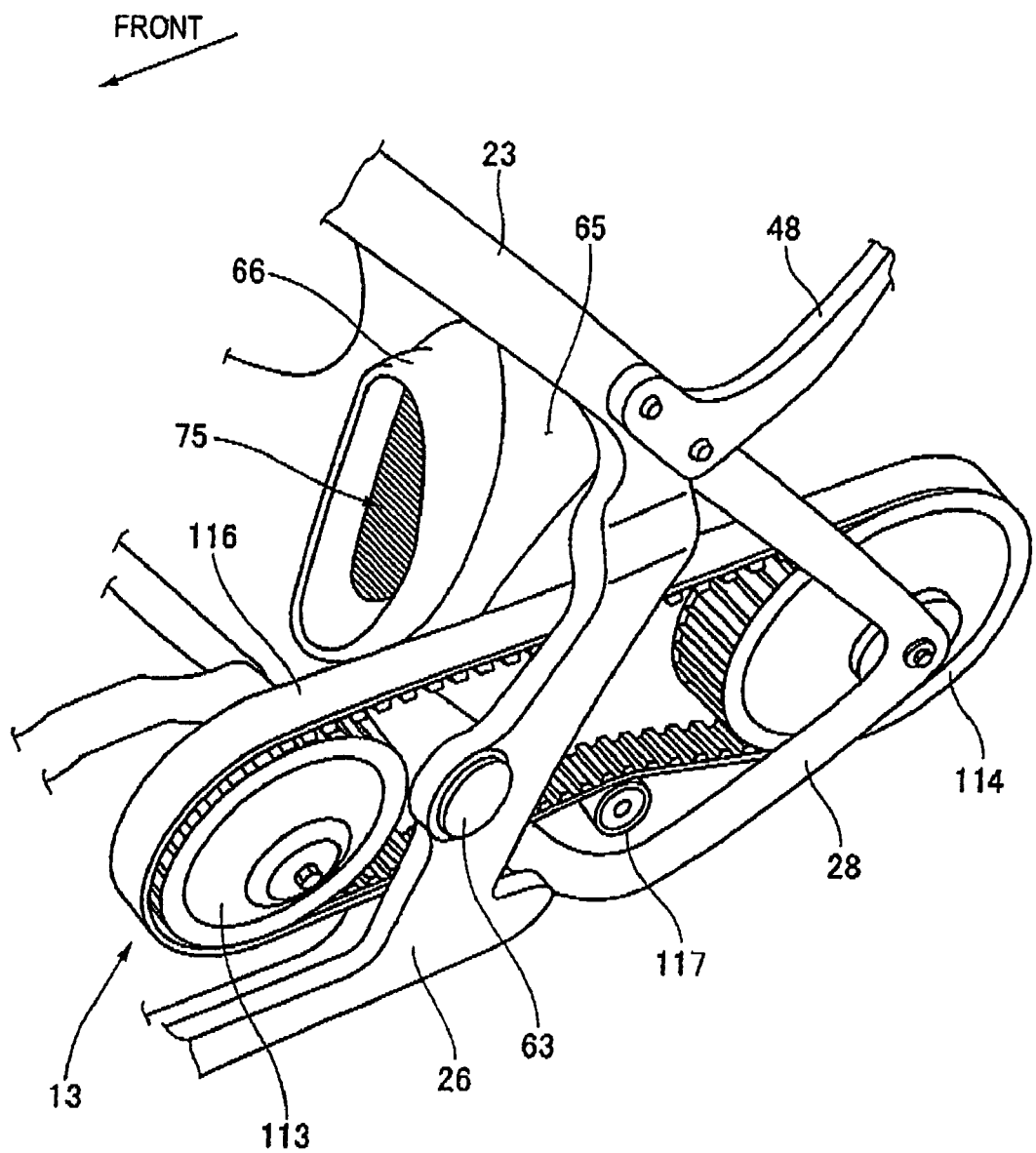
FIG. 37 is a perspective view which explains a driving force transmission mechanism according to the invention.

FIG. 37 is a perspective view which explains a driving force transmission mechanism according to the invention and shows that a drive pulley 113 is mounted on an output shaft 13a (refer to FIG. 36) of a transmission 13, a driven pulley 114 is integrally mounted on the rear wheel 16 (refer to FIG. 36), a toothed belt 116 is extended between the drive pulley 113 and the driven pulley 114, and a predetermined tension is imparted to the toothed belt 116 by a tension pulley 117 which functions as a belt tensioner.

By adopting this configuration, the driving force of the engine 12 is transmitted to the rear wheel 16 via the transmission 13, the output shaft 13a, the drive pulley 113, the toothed belt 116 and the driven pulley 114.

An intake duct 66 is such as to be mounted on the side cover 65.

Figure 38:
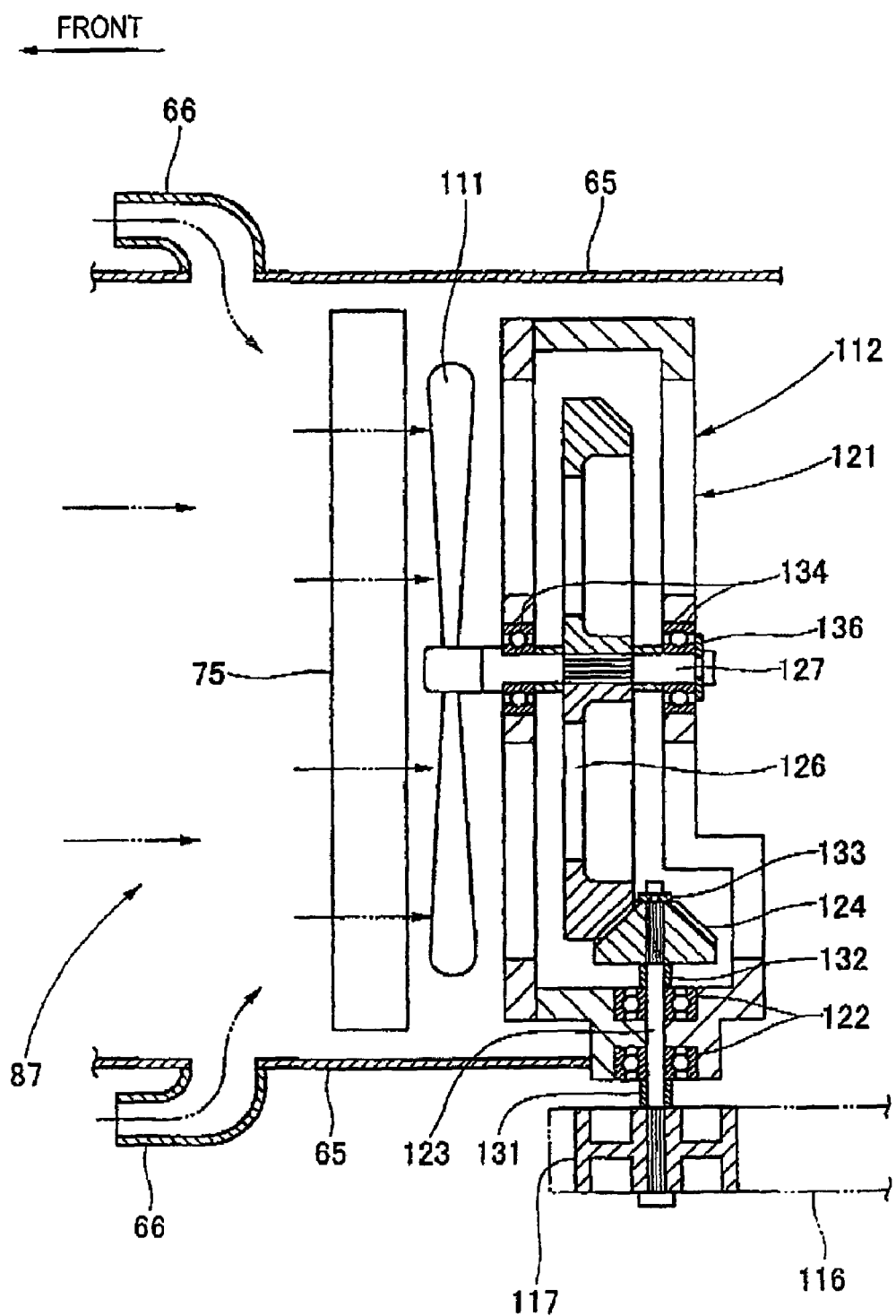
FIG. 38 is a sectional view which shows a fan driving unit according to the invention.

FIG. 38 is a sectional view which shows the fan driving unit according to the invention, and the fan driving unit 112 is made up of a case 121 that is mounted on the left and right pivot plates 26 (refer to FIG. 36), a pulley shaft 123 that is rotatably mounted on the case 121 via bearings 122, 122, the tension pulley 117 that is spline joined to one end of the pulley shaft 123, a small bevel gear 124 that is spline joined to the other end of the pulley shaft 123, a large bevel gear 126 which is brought into mesh engagement with the small bevel gear 124 and a support shaft 127 that supports the large bevel gear 126 through spline joint and which is connected to the cooling fan 111.

Here, reference numerals 131, 132 denote collars, 133 a snap ring, 134, 134 bearings which support rotatably the support shaft 127 on the case 121, and 136 a snap ring.

The function of the radiator arranging construction that has been described above will next be described.

When the engine is started to run and the driving force thereof is transmitted from the transmission to the rear wheel via the toothed belt 116, the tension pulley 117 rotates in association therewith.

Then, the rotation of the tension pulley 117 is transmitted to the small bevel gear 124 via the pulley shaft 123, and then from the small bevel gear 124 to the large bevel gear 126. As a result, the support shaft 127 which supports the large bevel gear 126 rotates, and the cooling fan then rotates, whereby air within the space 87 is forced to flow to the rear of the vehicle through the radiator 75.

Since running air enters the space 87 from the intake ducts 65 in addition to running air that is taken in from the front of the radiator, the amount of air required to cool the radiator 75 can be secured.

The case 121 may be mounted on the swing arm 28 (refer to FIG. 36), and as this occurs, the positional relationship between the tension pulley 117 on the side of the case 121 and the toothed belt 116 is maintained constant.

Figure 39A:
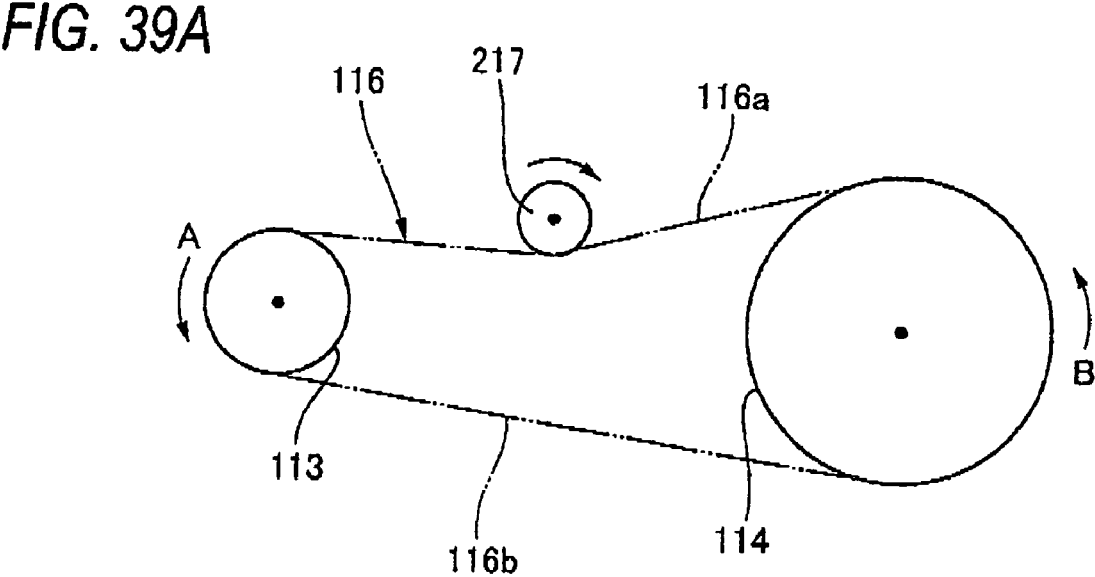
FIG. 39A is a function diagram which shows the function of a belt tensioner of a comparison example.
Figure 39B:
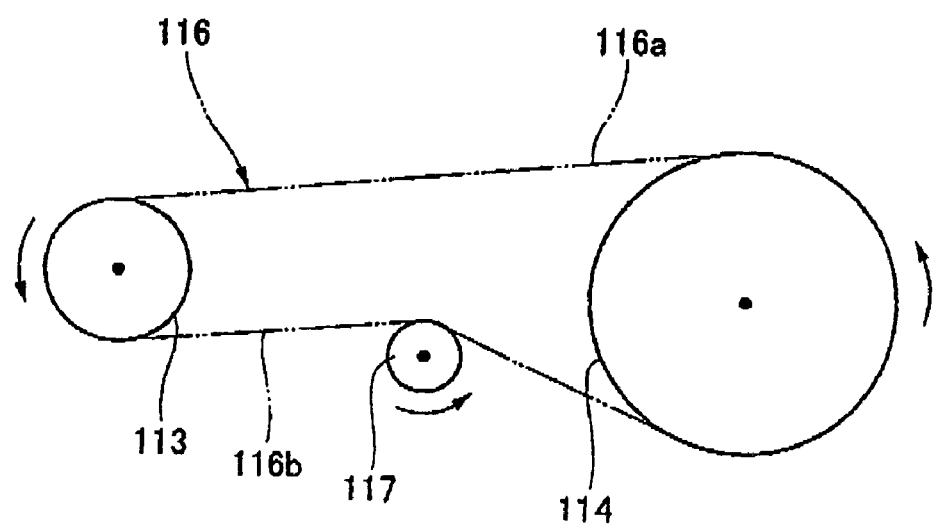
FIG. 39B is a function diagram which shows a belt tensioner of the embodiment.

FIGS. 39A, 39B are function diagrams which compare the functions of belt tensioners.

FIG. 39A shows a comparison example. Since the drive pulley 113 rotates in a direction indicated by an arrow A, whereas the driven pulley 114 rotates in a direction indicated by an arrow B, an upper side of the toothed belt 116 constitutes a taut side 116a and a lower side thereof constitutes a slack side 116b. In this comparison example, a tension pulley 217 is provided on the taut side 11a of the toothed belt 116.

FIG. 39B shows an inventive example (according to the sixth embodiment), and in the invention, the tension pulley 117 is provided on the slack side of the toothed belt 116.

For example, with no tension pulley provided, a play is generated more on the slack side 116b than the taut side 116a.

In the invention, by providing the tension pulley 117 on the slack side 116b, the generation of play on the slack side 116b of the toothed belt 116 can be suppressed well compared with the comparison example shown in FIG. 39A.

In addition, in the event that an external load is applied to the cooling fan 111 (refer to FIG. 38) to thereby create an excessively loaded state in which the tension pulley 117 is stopped or is nearly stopped, a slippage is generated between the toothed belt 116, which is rotating at high speeds, and the tension pulley 117, whereby the application of such an excessive load to the toothed belt 116 can be prevented.

Furthermore, in FIGS. 36 and 39B, even in the event that the toothed belt 116 fluctuates in association with the fluctuation of the swing arm 28 due to the tension pulley 117 being mounted on the left and right pivot plates 26 via the case 121 (refer to FIG. 38), since the tension pulley 117 is provided on the slack side 116b, the state can be maintained in which the toothed belt 116 is in contact with the tension pulley 117 at all times.

Figure 40:
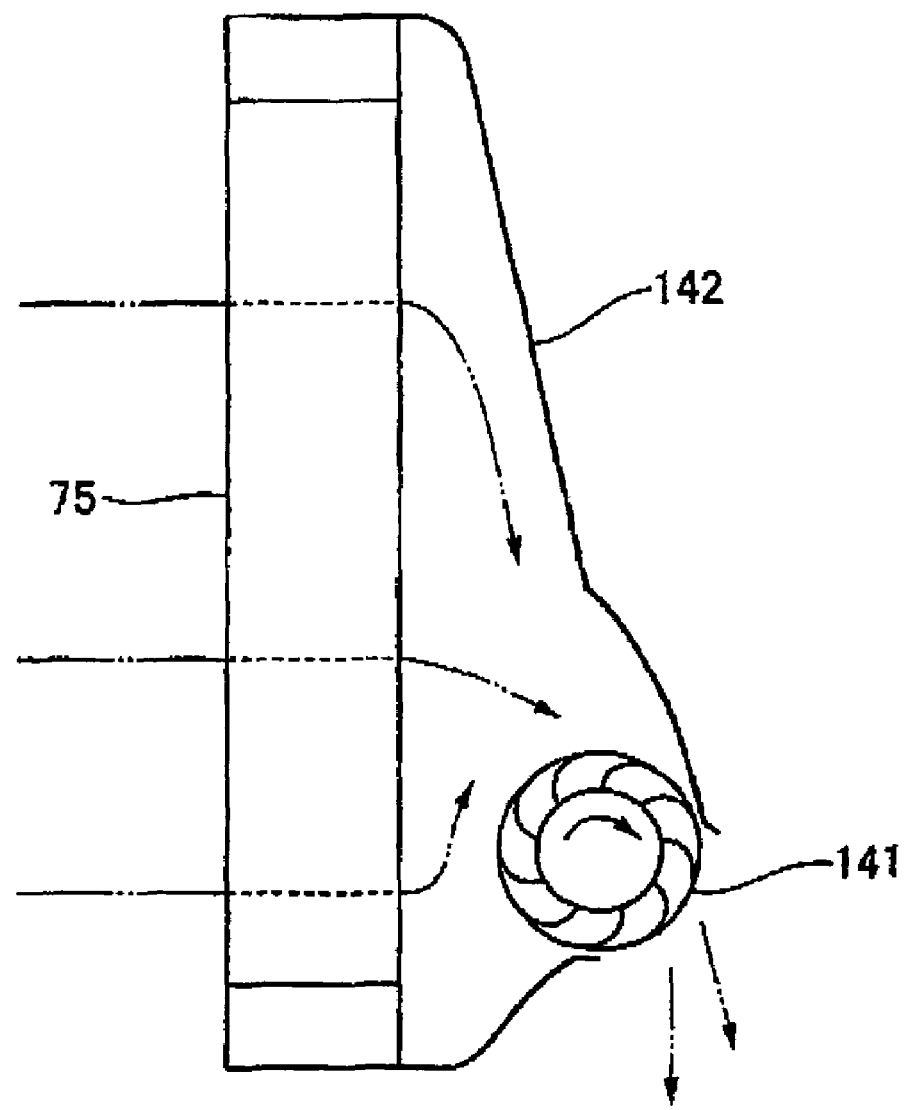
FIG. 40 is an explanatory diagram which shows another form of embodying the radiator arranging construction according to the invention.

FIG. 40 is an explanatory diagram which shows another form of a radiator arranging construction according to the invention and shows that a cooling fan 141 is arranged at the back of the radiator 75 and the periphery of the cooling fan 141, is covered by a shroud 142.

Thus, the cooling fan 141 is allowed to send air efficiently by covering the periphery of the cooling fan 141 by the shroud 142, and the amount of air that passes through the radiator 75 can be increased, thereby making it possible to enhance the cooling performance of cooling the radiator 75.

Thus, as has been described by reference to FIG. 36, according to a first aspect of the invention of the sixth embodiment, in the motorcycle 10 (refer to FIG. 35) in which the rear wheel 16 is belt driven by the water-cooled engine 12, the radiator 75 is arranged in the space defined between the engine 12 and the rear wheel 16, the cooling fan 111 is driven to rotate by virtue of the driving force of the toothed belt 116, and the radiator 75 is cooled by the cooling fan 111 so driven to rotate.

Since the radiator 75 is arranged in the space 87 between the engine 12 and the rear wheel 16, the front of the radiator 75 can be covered by the engine 12, and the rear of the radiator 75 can be covered by the rear wheel 16, whereby the radiator 75 is made difficult to see from the longitudinal direction of the vehicle, thereby making it possible to enhance the external appearance characteristic of the motorcycle 10.

In addition, since the cooling fan 111 is driven to rotate by virtue of the driving force of the toothed belt 116 and the radiator 75 is forced to be cooled by the cooling fan 111, even in the event that the radiator 75 is situated inside the vehicle a similar cooling capability of the radiator 75 can be secured to that provided by the radiator provided in the vicinity of the front of the body frame.

As has been described by reference to FIG. 38, according to a second aspect of the invention of the sixth embodiment, the cooling fan 111 is connected to a rotational shaft or the pulley shaft 123 of the tension pulley 117 which functions as a belt tensioner to stretch the toothed belt 116.

Since the cooling fan 111 is connected to the pulley shaft 123 of the tension pulley 117 which stretches the toothed belt 116, no particular power such as provided by an electric motor is necessary, thereby making it possible to suppress an increase in production costs of the motorcycle 10 (refer to FIG. 35). In addition, the cooling capability of the cooling fan 111 can be altered according to the rotational speed of the tension pulley 117.

As has been described by reference to FIG. 40, according to a third aspect of the invention of the sixth embodiment, the shroud 142 is provided around the periphery of the cooling fan 141.

Since the shroud 142 is provided around the periphery of the cooling fan 141, a flow of air can be generated efficiently by the cooling fan 141, and the amount of air that passes through the radiator 75 can be increased, whereby the cooling performance of cooling the radiator 75 can be improved.

According to a second aspect of the invention of the sixth embodiment, in FIG. 36, the radiator 75 is provided on the swing arm 28 which supports the rear wheel 16 in such a manner as to freely swing in a vertical direction and the cooling fan 111 is provided between the radiator 75 and the rear wheel 16.

Since the radiator 75 is provided on the swing arm 28 and the cooling fan 111 is provided between the radiator 75 and the rear wheel 16, the positional relationship between the radiator 75 and the rear wheel 16 can be maintained constant, and the radiator 75 can be cooled by making use of the flow of air generated by the rotation of the rear wheel 16 at all times, whereby the dissipation of heat in the radiator 75 can be promoted. Furthermore, the flow of air can be intensified by the cooling fan 111, whereby the dissipation of heat in the radiator 75 can be promoted further.

According to a second aspect of the invention of the sixth embodiment, as shown in FIGS. 36, and 38, running air is introduced into the radiator 75 via the intake ducts 66 provided on the body and the running air so taken in is sent to the rear of the radiator 75 by the cooling fan 111 so as to be discharged to below the body virtue of the rotation of the rear wheel 16.

Since running air is introduced into the radiator 75 via the intake ducts 66 and the running air so taken in is sent to the rear of the radiator 75 by the cooling fan 111 so as to be discharged to below the body virtue of the rotation of the rear wheel 16, the path through which running air is to flow is secured and the sending of air through the path so secured can be promoted by the cooling fan 111, whereby the amount of air that is blown against the radiator 75 can be increased, thereby making it possible to enhance the cooling capability by the radiator 75.

Note that in the embodiment shown in FIG. 38, a shroud may be provided which covers the periphery of the cooling fan 111.

While there has been described in connection with the preferred embodiments thereof, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A motorcycle radiator arranging construction for a motorcycle having a water-cooled engine installed thereon,
    wherein a radiator is arranged erect in a space defined between the engine and a rear wheel in such a manner that a cooling surface of the radiator is directed in a longitudinal direction of the vehicle and is supported by a body frame, and
    a rear mudguard covers a front and a top portion of a rear wheel and a slit is provided in a front portion of the rear mudguard.

2. The motorcycle radiator arranging construction as set forth in claim 1, wherein side surfaces of the space is covered by covers.

3. The motorcycle radiator arranging construction as set forth in claim 1, wherein a pair of left and right main frames are extended rearwards from a headpipe which supports a front fork in a steerable fashion, and interiors of the main frames are formed into ducts so that running air is guided into the space from the vicinity of the headpipe through the interiors of the main frames.

4. The motorcycle radiator arranging construction as set forth in claim 2, wherein an intake duct is provided on the cover for guiding running air into the space.

5. The motorcycle radiator arranging construction as set forth in claim 1, wherein the radiator is supported between left and right pivot plates which make up the body frame.

6. The motorcycle radiator arranging construction as set forth in claim 5, wherein the radiator is arranged so as to substantially coincide with the left and right pivot plates as viewed from the side of the motorcycle.

7. The motorcycle radiator arranging construction as set forth in claim 1, wherein the slit is horizontally elongated into an opening and a bent portion, and the bent portion is provided inward of the rear mudguard, so as to be formed into a V-shape.

8. The motorcycle radiator arranging construction as set forth in claim 7, wherein the bent portion intersects with a tangent drawn from the outer circumference of the rear wheel.

* * * * *